United States Patent
Tanaka

(10) Patent No.: US 9,206,277 B2
(45) Date of Patent: Dec. 8, 2015

(54) MODIFIED CONJUGATED DIENE RUBBER, METHOD FOR PRODUCING SAME, AND RUBBER COMPOSITION

(75) Inventor: Ryouji Tanaka, Tokyo (JP)

(73) Assignee: JSR CORPORATION, Tokyo (JP)

( * ) Notice: Subject to any disclaimer, the term of this patent is extended or adjusted under 35 U.S.C. 154(b) by 112 days.

(21) Appl. No.: 13/979,522

(22) PCT Filed: Jan. 11, 2012

(86) PCT No.: PCT/JP2012/050364
§ 371 (c)(1),
(2), (4) Date: Jul. 12, 2013

(87) PCT Pub. No.: WO2012/096300
PCT Pub. Date: Jul. 19, 2012

(65) Prior Publication Data
US 2013/0296481 A1    Nov. 7, 2013

(30) Foreign Application Priority Data

Jan. 12, 2011  (JP) ................. 2011-004105

(51) Int. Cl.
| | | |
|---|---|---|
| *C08C 19/25* | (2006.01) | |
| *C08F 236/10* | (2006.01) | |
| *C08C 19/24* | (2006.01) | |
| *C08C 19/20* | (2006.01) | |
| *C08C 19/22* | (2006.01) | |
| *B60C 1/00* | (2006.01) | |
| *C08L 15/00* | (2006.01) | |
| *C08C 19/44* | (2006.01) | |

(52) U.S. Cl.
CPC ............... *C08F 236/10* (2013.01); *B60C 1/00* (2013.01); *C08C 19/20* (2013.01); *C08C 19/22* (2013.01); *C08C 19/24* (2013.01); *C08C 19/25* (2013.01); *C08C 19/44* (2013.01); *C08L 15/00* (2013.01); *Y02T 10/862* (2013.01)

(58) Field of Classification Search
None
See application file for complete search history.

(56) References Cited

U.S. PATENT DOCUMENTS

| | | |
|---|---|---|
| 2001/0036991 A1 | 11/2001 | Robert et al. |
| 2002/0123554 A1 | 9/2002 | Ko et al. |
| 2008/0319151 A1 | 12/2008 | Oshima |
| 2009/0292044 A1 | 11/2009 | Kawazura et al. |
| 2010/0249270 A1* | 9/2010 | Robert et al. ............ 523/150 |
| 2013/0245192 A1 | 9/2013 | Tanaka et al. |

FOREIGN PATENT DOCUMENTS

| | | |
|---|---|---|
| JP | 11-166020 | 6/1999 |
| JP | 2001 139633 | 5/2001 |
| JP | 2002 037976 | 2/2002 |
| JP | 2002 212227 | 7/2002 |
| JP | 2008-285558 | 11/2008 |
| WO | 2008 0004686 | 1/2008 |

OTHER PUBLICATIONS

Shen, Makromol. Chem. 190, 3061-3066 (1989).*
Extended Search Report issued Nov. 7, 2014 in European Patent Application No. 12734520.5.
Internatioanl Search Report Issued Apr. 24, 2012 in PCT/JP12/050364 Filed in Jan. 11, 2012.
Combined Office Action and Search Report issued Jul. 7, 2014 in Chinese Patent Application No. 201280004938.X (with English translation).

* cited by examiner

*Primary Examiner* — Robert C Boyle
(74) *Attorney, Agent, or Firm* — Oblon, McClelland, Maier & Neustadt, L.L.P.

(57) ABSTRACT

According to a method for producing a modified conjugated diene rubber, the method involves a step of obtaining a modified conjugated diene rubber by reacting a conjugated diene compound or a conjugated diene polymer which is obtained by polymerizing a conjugated diene compound and an aromatic vinyl compound and has an alkali metal or alkaline-earth metal active end, with a first hydrocarbyloxysilane compound having an alkyl polyether group and a group convertible into an onium, and a conjugated diene rubber which can be used as a starting material for a crosslinked rubber that is used in applications such as a tire tread and is capable of improving the low fuel consumption performance is provided.

12 Claims, No Drawings

MODIFIED CONJUGATED DIENE RUBBER, METHOD FOR PRODUCING SAME, AND RUBBER COMPOSITION

TECHNICAL FIELD

The present invention relates to a modified conjugated diene rubber, a method for producing the same, and a rubber composition comprising the modified conjugated diene rubber. More specifically, the invention relates to a method for producing a modified conjugated diene rubber which allows production of a crosslinked rubber excellent in tensile strength, abrasion resistance, wet skid resistance and low hysteresis-loss property, a modified conjugated diene rubber which is produced by such a production method and has an excellent shape-retaining property, a rubber composition containing such a modified conjugated diene rubber, and a crosslinked rubber (a vulcanized rubber) prepared by crosslinking (e.g. vulcanizing) the rubber composition.

BACKGROUND ART

Conjugated diene rubbers (e.g. a styrene-butadiene copolymer) obtained by methods of emulsion polymerization has been known as rubbers for automobile tires. Recently, under circumstances where improvements in low fuel consumption performance of automobiles have been expected, various types of conjugated diene rubber capable of realizing an excellent low fuel consumption performance have been proposed.

As an example, a conjugated diolefin (co)polymer rubber with the following characteristics (1) to (3) and a rubber composition containing the conjugated diolefin (co)polymer have been proposed: (1) it is a (co)polymer rubber of a conjugated diolefin or a conjugated diolefin and an aromatic vinyl compound; (2) it has a primary amino group and an alkoxysilyl group bound to the (co)polymer chain; and (3) a di- or more functional monomer is copolymerized in the (co)polymer chain, and/or, at least a portion of the (co)polymer chain is coupled with an di- or more functional coupling agent (Patent Document 1).

As another example, a modified diene polymer rubber that is obtained by a step 1 of obtaining an active polymer having an alkali metal end by polymerizing a conjugated diene monomer or a conjugated diene monomer and an aromatic vinyl monomer in a hydrocarbon solvent in the presence of an alkali metal catalyst and a step 2 of obtaining a modified polymer rubber by reacting the active polymer with a compound that is represented by a specific formula, and a rubber composition containing the modified diene polymer rubber have been proposed (Patent Document 2)

In addition, as a method for producing a modified polymer capable of increasing interactions with silica and carbon black to improve fracture characteristics, abrasion resistance and low-exothermic properties, there have been proposed a method of performing a primary modification reaction in which a polymer having an organometallic active site in the molecule is reacted with a hydrocarbyloxysilane compound at the active site and performing a subsequent secondary modification reaction in which the hydrocarbyloxysilane compound is further reacted via a condensation reaction between hydrocarbyloxysilyl groups, and a rubber composition containing the modified polymer obtained by the method (Patent Document 3).

RELATED ART DOCUMENTS

Patent Documents

Patent Document 1: JP-A-2004-18795
Patent Document 2: JP-A-2005-290355
Patent Document 3: WO 03/048216 A1

SUMMARY OF THE INVENTION

Problems that the Invention is to Solve

As mentioned above, various types of conjugated diene rubber capable of achieving excellent low fuel consumption performance of automobiles and rubber compositions using the conjugated diene rubbers have been proposed. However, further increase in gas mileage of automobiles is still expected under financial circumstances, such as a steep rise in gasoline prices, and environmental circumstances including carbon dioxide emissions.

Accordingly, an object of the present invention is to provide a modified conjugated diene rubber which is usable as a starting material of a crosslinked rubber which can be used in applications such as automobile tires and enhance the low fuel consumption performance of automobiles and the like and a method for producing the same.

Means for Solving the Problems

As a result of extensive studies to solve the foregoing problem, the inventors of the present invention have found that properties such as an excellent low hysteresis-loss property are imparted by reacting a conjugated diene polymer having an alkali metal or alkaline-earth metal active end with a specific hydrocarbyloxysilane compound and, as a result, a modified conjugated diene rubber capable of imparting low fuel consumption performance and controlling stability when the rubber is used for automobile tires or the like can be produced. Thus, they have accomplished the present invention.

Namely, the present invention provides the following [1] to [13].

[1] A method for producing a modified conjugated diene rubber, comprising (A) a step of obtaining a modified conjugated diene rubber by reacting a conjugated diene polymer having an alkali metal or alkaline-earth metal active end which is obtained by polymerizing a conjugated diene compound or a conjugated diene compound and an aromatic vinyl compound, with a first hydrocarbyloxysilane compound having the following functional groups (a) and (b):

Functional group (a): an alkyl polyether group
Functional group (b): a group convertible into an onium.

[2] The method for producing a modified conjugated diene rubber according to [1], wherein the functional group (b) is one or more functional groups selected from the group consisting of a nitrogen-containing group formed by substituting two protective groups for two hydrogen atoms of a primary amino group, a nitrogen-containing group formed by substituting one protective group for one hydrogen atom of a secondary amino group, a tertiary amino group, an imino group, a pyridyl group, a phosphorus-containing group formed by substituting two protective groups for two hydrogen atoms of a primary phosphino group, a phosphorus-containing group formed by substituting one protective group for one hydrogen atom of a secondary phosphino group, a tertiary phosphino group, and a sulfur-containing group formed by substituting one protective group for one hydrogen atom of a thiol.

[3] The method for producing a modified conjugated diene rubber according to [1] or [2], wherein the first hydrocarbyloxysilane compound is a silane compound represented by the following formula (I):

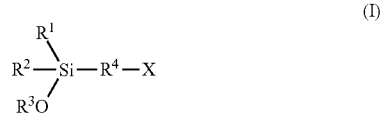

wherein $R_1$ is an alkyl polyether group represented by the formula: $-O-(R^5-O)_m-R^6$, wherein $R^5$ is the same or different in the case where $R^5$ is present plurally and is a hydrocarbon group having 1 to 30 carbon atoms, m is from 1 to 30 on average, and $R^6$ is a hydrocarbon group having 1 to 30 carbon atoms; $R^2$ is the same as $R^1$ or is an alkyl group having 1 to 12 carbon atoms or a group represented by $R^7O-$, wherein $R^7$ is a hydrocarbon group having 1 to 30 carbon atoms or a group represented by $(R^8)_3Si-$, wherein $R^8$ is an alkyl group or an alkenyl group which has 1 to 30 carbon atoms; $R^3$ is a hydrocarbon group having 1 to 30 carbon atoms; $R^4$ is a hydrocarbon group having 1 to 30 carbon atoms; X is a nitrogen-containing group, a phosphorus-containing group, or a sulfur-containing group, which has no active hydrogen or whose active hydrogen is substituted by a protective group, wherein at least one of the nitrogen, phosphorus, or sulfur atom contained in the nitrogen-containing group, the phosphorus-containing group, or the sulfur-containing group is bound to $R^4$.

[4] The method for producing a modified conjugated diene rubber according to any one of [1] to [3], comprising at least one step selected from the group consisting of the following steps (B) to (D) after the step (A):
(B) a step of mixing the modified conjugated diene rubber obtained in the preceding step with an onium-forming agent,
(C) a step of mixing the modified conjugated diene rubber obtained in the preceding step with a catalyst containing a metal element for condensing a hydrocarbyloxysilane compound, and
(D) a step of mixing the modified conjugated diene rubber obtained in the preceding step with a second hydrocarbyloxysilane compound having a group convertible into an onium.

[5] The method for producing a modified conjugated diene rubber according to [4], wherein the onium-forming agent is one or more compounds selected from the group consisting of a silicon halide compound, a tin halide compound, an aluminum halide compound, a titanium halide compound, a zirconium halide compound, a germanium halide compound, a gallium halide compound, a zinc halide compound, a sulfuric ester, a phosphoric ester, a carboxylic acid, and a sulfonic acid.

[6] The method for producing a modified conjugated diene rubber according to [4] or [5], wherein the catalyst containing a metal element is a metallic compound containing at least one metal element selected from metal elements included in the group 4, the group 12, the group 13, the group 14, and the group 15 of the periodic table.

[7] The method for producing a modified conjugated diene rubber according to [6], wherein an alkoxide, carboxylate salt, or acetylacetonate complex salt of the metal element is used as the catalyst containing a metal element.

[8] The method for producing a modified conjugated diene rubber according to any one of [4] to [7], wherein the method includes at least the above step (D) and the group convertible into an onium in the second hydrocarbyloxysilane compound is one or more groups selected from the group consisting of a primary amino group, a secondary amino group, a tertiary amino group, an imino group, a pyridyl group, a primary phosphino group, a secondary phosphino group, a tertiary phosphino group, and a thiol group.

[9] The method for producing a modified conjugated diene rubber according to any one of [1] to [8], wherein the method further includes a step of bringing water into contact.

[10] A modified conjugated diene rubber obtained by means of the method for producing a modified conjugated diene rubber according to any one of [1] to [9].

[11] A rubber composition comprising the modified conjugated diene rubber according to [10], silica and/or carbon black, and a crosslinking agent.

[12] A crosslinked rubber prepared by crosslinking the rubber composition according to [11].

[13] A tire comprising the crosslinked rubber according to [12].

Effect of the Invention

According to the production method of the present invention, a modified conjugated diene rubber excellent in shape-retaining property can be produced, which allows preparation of a crosslinked rubber excellent in tensile strength, abrasion resistance, wet skid resistance, and low hysteresis-loss property.

Since the crosslinked rubber prepared using the modified conjugated diene rubber is excellent in wet skid resistance, the crosslinked rubber can enhance controlling stability of automobiles and the like when it is used in applications such as automobile tires.

Moreover, since the crosslinked rubber prepared using the modified conjugated diene rubber is excellent in abrasion resistance and low hysteresis-loss property, the crosslinked rubber can enhance a low fuel consumption performance of automobiles and the like when it is used in applications such as automobile tires.

MODE FOR CARRYING OUT THE INVENTION

[Step (A)]

The method for producing a modified conjugated diene rubber in the present invention includes (A) a step of reacting a conjugated diene polymer having an alkali metal or alkaline-earth metal active end, which is obtained by polymerizing a conjugated diene compound or a conjugated diene compound and an aromatic vinyl compound, with a first hydrocarbyloxysilane compound having an alkyl polyether group (hereinafter also referred to as "functional group (a)") and a group convertible into an onium (hereinafter also referred to as "functional group (b)").

By the step (A), a modified conjugated diene rubber in which the conjugated diene polymer is modified can be obtained.

In the present description, the modified conjugated diene rubber is a rubber composed of the above modified conjugated diene polymer or a rubber obtained by mixing the modified conjugated diene polymer with at least one selected from the group consisting of an onium-forming agent, a catalyst containing a metal element, and a second hydrocarbyloxysilane compound to be mentioned later.

As the conjugated diene polymer having an alkali metal or alkaline-earth metal active end, an anionic polymer produced through the polymerization of a conjugated diene compound alone or the copolymerization of a conjugated diene compound and an aromatic vinyl compound can be mentioned.

As mentioned above, the method for producing the conjugated diene polymer has no particular limitation except for performance of anionic polymerization with an alkali metal or an alkaline-earth metal (hereinafter also referred to as "polymerization initiator"). For example, as the method for polymerization, any of methods, including a solution polymerization method, a vapor-phase polymerization method and a bulk polymerization method, can be used. Particularly, a solution polymerization method is preferably used. Additionally, the manner of polymerization may be either a batch style or a continuous style. The metal atom at the active site present in a molecule of the conjugated diene polymer is an alkali metal or an alkaline-earth metal and is preferably lithium, sodium, potassium, magnesium, or barium and particularly preferably lithium. Any of these alkali metal and alkaline-earth metals has similar activity in terms of allowing the production of a conjugated diene polymer having a metal active end that is reactive with the first alkoxysilane compound, and even if some of those metals are not described in Examples to be mentioned later, they can be used in the present invention.

Furthermore, it is also effective to incorporate a monomer containing a functional group and activate the functional group in the polymer by an alkali metal initiator. For instance, it is effective that the functional group moiety of a copolymer containing an isobutylene unit, a para-methylstyrene unit or a para-halomethylstyrene unit is converted into an active site by subjecting the moiety to lithiation.

As the conjugated diene compound (hereinafter also referred to as "conjugated diene monomer"), for example, 1,3-butadiene, isoprene, 2,3-dimethyl-1,3-butadine, 1,3-pentadiene, 1,3-hexadiene, 1,3-heptadiene, 2,3-dimethylbutadiene, 2-phenyl-1,3-butadiene, 3-methyl-1,3-pentadiene, 1,3-hexadiene, 2-chloro-1,3-butadine and the like can be suitably used. These compounds may be used alone, or two or more of them may be used in combination. Of these compounds, 1,3-butadine, isoprene, 2,3-dimethyl-1,3-butadiene, and the like can be especially suitably used. Any of the conjugated diene monomers has similar activity in terms of allowing the production of a conjugated diene polymer having a metal active end that is reactive with the first hydrocarbyloxysilane compound. Even if some of those monomers are not described in Examples to be mentioned later, they can be used in the present invention.

As the aromatic vinyl compound, for example, styrene, 2-methylstyrene, 3-methylstyrene, 4-methylstyrene, α-methylstyrene, 2,4-dimethylstyrene, 2,4-diisopropylstyrene, 4-tert-butylstyrene, 5-t-butyl-2-methylstyrene, vinylethylbenzene, divinylbenzene, trivinylbenzene, divinylnaphthalene, tert-butoxystyrene, vinylbenzyldimethylamine, (4-vinylbenzyl)dimethylaminoethyl ether, N,N-dimethylaminomethylstyrene, N,N-dimethylaminoethylstyrene, 2-ethylstyrene, 3-ethylstyrene, 4-ethylstyrene, 2-t-butylstyrene, 3-t-butylstyrene, 4-t-butylstyrene, vinylxylene, vinylnaphthalene, vinyltoluene, vinylpyridine, diphenylethylene, diphenylethylenes containing a tertiary amino group, and the like can be suitably used. These compounds may be used alone, or two or more of them may be used in combination. Among such compounds, styrene is particularly suitable. Any of the aromatic vinyl compounds has similar activity in terms of allowing the production of a conjugated diene polymer having a metal active end that is reactive with the first hydrocarbyloxysilane compound. Even if some of the compounds are not described in Examples to be mentioned later, they can be used in the present invention.

Furthermore, when copolymerization is carried out using a conjugated diene monomer and an aromatic vinyl compound, it is preferable to use 1,3-butadiene and styrene, respectively. The monomers are not only easily available but also superior in point of having high living capability in anionic polymerization. Additionally, when a solution polymerization method is used, the suitable monomer concentration in a solvent is preferably from 5 to 50 mass %, more preferably from 10 to 30 mass %, in terms of maintenance of a balance between productivity and easiness of polymerization control. In this connection, in the case of carrying out copolymerization by using a conjugated diene monomer and an aromatic vinyl compound, the content of the aromatic vinyl compound in a monomer mixture to be charged is preferably from 3 to 55 mass %, more preferably from 5 to 50 mass %, in terms of maintenance of a balance between a low hysteresis-loss property and wet skid resistance of a crosslinked rubber composition to be obtained.

Examples of a compound which is used as an alkali metal or alkaline-earth metal polymerization initiator include alkyllithium, alkylenedilithium, lithium alkyleneimide, lithium dialkylamide, phenyllithium, stilbene lithium, lithium naphthalene, sodium naphthalene, potassium naphthalene, n-butylmagnesium, n-hexylmagnesium, calcium ethoxide, calcium stearate, strontium t-butoxide, barium ethoxide, barium isopropoxide, ethylmercaptobarium, barium t-butoxide, barium phenoxide, diethylaminobarium, barium stearate, ketyl barium, biphenylsodium, potassium-tetrahydrofuran complex, potassium-diethoxyethane complex, and sodium salt of α-methylstyrene tetramer. Among these compounds, organolithium compounds including alkyllithium and the like and lithium amide compounds including lithium alkyleneimide and the like can be mentioned as especially suitable examples. In the case of using the former organolithium compound, a conjugated diene polymer having a hydrocarbon group at the polymerization initiation end and a polymerization active site at the other end is obtained. In the case of using a lithium amide compound, a conjugated diene polymer having a nitrogen-containing group at the polymerization initiation end and a polymerization active site at the other end is obtained. As to the alkali metal or alkaline-earth metal polymerization initiators, any of them has similar activity in terms of allowing the production of a conjugated diene polymer having a metal active end that is reactive with the first hydrocarbyloxysilane compound. Even if some of the initiators are not described in Examples to be mentioned later, they can be used in the present invention.

As the organolithium compound, a lithium compound having a hydrocarbon group containing 1 to 20 carbon atoms is preferable. Examples thereof include methyllithium, ethyllithium, n-propyllithium, isopropyllithium, n-butyllithium, sec-butyllithium, tert-octyllithium, n-decyllithium, phenyllithium, 2-naphthyllithium, 2-butylphenyllithium, 4-phenylbutyllithium, cyclohexyllithium, a product of reaction between diisopropenylbenzene and butyllithium, t-butyllithium, n-hexyllithium, benzyllithium, phenyllithium, stilbene lithium, 1,4-dilithiobutane, 1,3,5-trilithiobenzene, a product of reaction of n-butyllithium with 1,3-butadiene and divinylbenzene, a product of reaction of n-butyllithium with a polyacetylene compound, 4-cyclopentyllithium, 1,2-dilithiomethane, 1,4-dilithiobutane, 1,4-dilithio-2-ethylcylohexane, 1,3,5-trilithiobenzene, and the like. Among these compounds, n-butyllithium and sec-butyllithium are preferable.

On the other hand, examples of the lithium amide compound include lithium hexamethyleneimide, lithium pyrrolidide, lithium piperidide, lithium heptamethyleneimide, lithium dodecamethyleneimide, lithium morpholide, lithium dimethylamide, lithium diethylamide, lithium dibutylamide, lithium dipropylamide, lithium diisopropylamide, lithium diheptylamide, lithium dihexylamide, lithium dioctylamide, lithium di-2-ethylhexylamide, lithium didecylamide, lithium N-methylpiperazide, lithium ethylpropylamide, lithium ethylbutylamide, lithium ethylbenzylamide, lithium methylphenethylamide, 3-[N,N-bis(trimethylsilyl)]-1-propyl lithium, 3-[N,N-bis(trimethylsilyl)]-2-methyl-1-propyl lithium, 3-[N,N-bis(trimethylsilyl)]-2,2-dimethyl-1-propyl lithium, 4-[N,N-bis(trimethylsilyl)]-1-butyl lithium, 5-[N,N-bis(trimethylsilyl)]-1-pentyl lithium, 8-[N,N-bis(trimethylsilyl)]-1-octyl lithium, 3-(2,2,5,5-tetramethyl-2,5-disila-1-azacyclopentane)-1-propyl lithium, 2-methyl-3-(2,2,5,5-tetramethyl-2,5-disila-1-azacyclopentane)-1-propyl lithium, 2,2-dimethyl-3-(2,2,5,5-tetramethyl-2,5-disila-1-azacyclopentane)-1-propyl lithium, 4-(2,2,5,5-tetramethyl-2,5-disila-1-azacyclopentane)-1-butyl lithium, 6-(2,2,5,5-tetramethyl-2,5-disila-1-azacyclopentane)-1-hexyl lithium, and the like. Among the compounds, cyclic lithium amides such as lithium hexamethyleneimide, lithium pyrrolidide, lithium piperidide, lithium heptamethyleneimide, and lithium dodecamethyleneimide are preferred in terms of their effects of interactions with carbon black and silica and their capabilities of initiating polymerization. Of these, lithium hexamethyleneimide, lithium pyrrolidide, and lithium piperidide are particularly preferred.

As to the lithium amide compounds, although those prepared in advance from secondary amines and lithium compounds are generally used as polymerization initiators in many cases, it is also possible to prepare them in polymerization systems (in situ). Additionally, the amount of such a polymerization initiator to be used is preferably selected from a range of 0.2 to 20 mmol per 100 g of monomer.

Examples of a specific method adopted in case of the production of a conjugated diene polymer through anionic polymerization using the above lithium compound as a polymerization initiator include a method of subjecting a conjugated diene monomer or both a conjugated diene monomer and an aromatic vinyl compound to anionic polymerization in a reaction-inactive organic solvent, e.g., a hydrocarbon solvent, such as an aliphatic, alicyclic, aromatic hydrocarbon compound or the like, by using the lithium compound as a polymerization initiator in the presence of a randomizer used as desired. In accordance with such a method, intended conjugated diene polymers can be obtained.

As the hydrocarbon solvent, those containing 3 to 8 carbon atoms are preferable. Examples thereof include propane, n-butane, isobutane, n-pentane, isopentane, n-hexane, cyclohexane, propene, 1-butene, isobutene, trans-2-butene, cis-2-butene, 1-pentyne, 2-pentyne, 1-hexene, 2-hexene, benzene, toluene, xylene, ethylbenzene, heptane, cyclopentane, methylcyclopentane, methylcyclohexane, 1-pentene, 2-pentene, cyclohexene, and the like. The solvents may be used alone, or two or more of them may be used as a mixture.

Moreover, the randomizer used as desired is a compound having the action of controlling the microstructure of a conjugated diene polymer, such as the action of increasing the number of vinyl bonds (1,2-bonding) in the butadiene moieties of a butadiene-styrene copolymer or the number of vinyl bonds (1,2-bonding and 3,4-bonding) in an isoprene polymer, or a compound having the action of controlling compositional distribution of monomer units in a conjugated diene polymer, such as the action of randomizing butadiene units and styrene units in a butadiene-styrene copolymer. Such a randomizer has no particular limitation, and any of those chosen as appropriate from known compounds currently in use as randomizers can be used. Specifically, examples thereof include ethers and tertiary amines, such as dimethoxybenzene, tetrahydrofuran, dimethoxyethane, diethylene glycol dibutyl ether, diethylene glycol dimethyl ether, 2,2-di(tetrahydrofuryl)propane, 2-(2-ethoxyethoxy)-2-methylpropane, triethylamine, pyridine, N-methylmorpholine, N,N,N',N'-tetramethylethylenediamine, 1,2-dipiperidinoethane, ethylene glycol dibutyl ether, ethylene glycol dimethyl ether, diethyl ether, dioxane, trimethylamine, quinacridine, potassium t-amylate, potassium t-butylate, triphenylphosphine, tetrahydropyran, dibutyl ether, ethylene glycol diethyl ether, diethylene glycol diethyl ether, diphenyl ether, anisole, tripropylamine, tributylamine, N,N-diethylaniline, and quinoline. These randomizers may be used alone, or two or more of them may be used in combination.

In the case of intending to enhance reactivity of such a polymerization initiator as described above, or in the case of intending to arrange randomly an aromatic vinyl compound to be introduced into a polymer or incorporate a simple or long chain of aromatic vinyl compounds into a polymer, a potassium compound may be added together with the polymerization initiator. As the potassium compound which is added together with the polymerization initiator, potassium alkoxides and potassium phenoxides, typified by potassium isoproxide, potassium t-butoxide, potassium t-amyloxide, potassium n-heptaoxide, potassium benzyloxide, and potassium phenoxide; potassium salts of isovalerianic acid, caprylic acid, lauric acid, palmitic acid, stearic acid, oleic acid, linolenic acid, benzoic acid, phthalic acid, 2-ethylhexanoic acid, and the like; potassium salts of organic sulfonic acids such as dodecylbenzenesulfonic acid, tetradecylbenzenesulfonic acid, hexadecylbenzenesulfonic acid, and octadecylbenzenesulfonic acid; potassium salts of partial esters of organic phosphorous acids such as diethyl phosphite, diisopropyl phosphite, diphenyl phosphite, dibutyl phosphite, and dilauryl phosphite; and the like are used.

The amount of such a potassium compound to be added is preferably from 0.005 to 0.5 mol per gram-atomic equivalent of the alkali metal or alkaline-earth metal of a polymerization initiator. When the amount is smaller than 0.005 mol, addition of the potassium compound sometimes brings no effects (improvement in reactivity of polymerization initiators or randomization or incorporation of a simple or long chain of aromatic vinyl compounds). On the other hand, when the amount is greater than 0.5 mol, there sometimes occurs not only lowering of polymerization activity, which results in a significant reduction in productivity, but also reduction of modification efficiency in the modification reaction with the first hydrocarbyloxysilane compound.

The temperature of this polymerization reaction is preferably from −20 to 150° C. and more preferably from 0 to 120° C. Although the polymerization reaction can be carried out under generated pressure, it is appropriate in ordinary cases that operations are performed under pressure high enough to substantially keep the monomer(s) in a liquid phase. Namely, depending on the individual substances to be polymerized, the medium to be used in polymerization, and the polymerization temperature chosen, higher pressure in comparison with generated pressure can be used if desired. Such pressure can be obtained in an appropriate way, such as pressurization of a reaction vessel with a gas inactive in the polymerization reaction.

In the polymerization, all that are used as starting materials participating in the polymerization, including a polymerization initiator, a solvent, a monomer, and so on, are preferably those wherein reaction-inhibiting substances, such as water, oxygen, carbon dioxide, and protonic compounds have been removed. Additionally, in the case of producing a polymer as an elastomer, the glass transition temperature (Tg) of the polymer or copolymer obtained is preferably from −90° C. to 0° C., which is determined by a differential thermal analysis. It is difficult to obtain a polymer having a glass transition temperature lower than −90° C. On the other hand, when the glass transition temperature is higher than 0° C., viscosity is too high in the region of room temperature and cases occur in which handling becomes difficult.

In the present invention, the hydrocarbyloxysilane compound is a compound in which one or more hydrocarbyl groups are bonded to a silicon atom. Examples of the hydrocarbyloxy group include an alkyloxy group, an aryloxy group, an aralkyloxy group, a cycloalkyloxy group, and the like.

In the first hydrocarbyloxysilane compound, the number of the hydrocarbyloxy group contained in the hydrocarbyloxysilyl group is one or more and, in view of reactivity with the conjugated diene polymer having an alkali metal or alkaline-earth metal active end, a catalyst containing a metal element to be mentioned later, and the second hydrocarbyloxysilane compound, is preferably two or more. As a suitable hydrocarbyloxy group, an alkyloxy group having 1 to 20 carbon atoms or an aryloxy group can be mentioned. In this connection, in the case where two hydrocarbyloxy groups are present, they may be the same or different from every other groups.

As the alkyl polyether group of the above functional group (a) in the first hydrocarbyloxysilane compound, specifically, those represented by the formula: —O—(R$^5$—O)$_m$—R$^6$ to be described later may be mentioned.

By introducing the alkyl polyether group, the interaction with silica increases, abrasion resistance of the resulting crosslinked rubber is enhanced, and a balance between a low hysteresis-loss property and wet skid resistance can be also enhanced.

In the first hydrocarbyloxysilane compound, the group convertible into an onium of the functional group (b) is a group substituted by a protective group in order to prevent the reaction with the alkali or alkaline-earth metal active end of a conjugated diene polymer and a group convertible into an onium by the action of an onium-forming agent after removal of the protective group. It is sufficient that at least one group convertible into an onium is present per molecule. Specifically, examples thereof include a nitrogen-containing group formed by substituting two protective groups for two hydrogen atoms of a primary amino group, a nitrogen-containing group formed by substituting one protective group for one hydrogen atom of a secondary amino group, a tertiary amino group, an imino group, a pyridyl group, a phosphorus-containing group formed by substituting two protective groups for two hydrogen atoms of a primary phosphino group, a phosphorus-containing group formed by substituting one protective group for one hydrogen atom of a secondary phosphino group, a tertiary phosphino group, and a sulfur-containing group formed by substituting one protective group for one hydrogen atom of a thiol. The first alkoxysilane compounds may be used alone, or two or more thereof may be used in combination.

As the first hydrocarbyloxysilane compound having the functional group (a) and the functional group (b) of the present invention, for example, a silane compound represented by the following formula (I) may be mentioned:

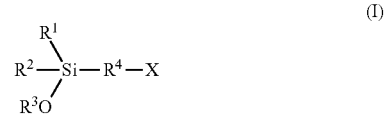

wherein $R_1$ is an alkyl polyether group represented by the formula: —O—(R$^5$—O)$_m$—R$^6$, wherein R$^5$ is the same or different in the case where R$^5$ is present plurally and is a hydrocarbon group having 1 to 30 carbon atoms, m is from 1 to 30 on average, and R$^6$ is a hydrocarbon group having 1 to 30 carbon atoms; R$^2$ is the same as R$^1$ or is an alkyl group having 1 to 12 carbon atoms or a group represented by R$^7$O—, wherein R$^7$ is a hydrocarbon group having 1 to 30 carbon atoms or a group represented by (R$^8$)$_3$Si—, wherein R$^8$ is an alkyl group or an alkenyl group which has 1 to 30 carbon atoms; R$^3$ is a hydrocarbon group having 1 to 30 carbon atoms; R$^4$ is a hydrocarbon group having 1 to 30 carbon atoms; X is a nitrogen-containing group, a phosphorus-containing group, or a sulfur-containing group, which has no active hydrogen or whose active hydrogen is substituted by a protective group, where at least one of the nitrogen, phosphorus, or sulfur atom contained in the nitrogen-containing group, the phosphorus-containing group, or the sulfur-containing group is bound to R$^4$.

Here, R$^5$ is a divalent hydrocarbon group having 1 to 30 carbon atoms and is, for example, a branched or non-branched saturated or unsaturated divalent hydrocarbon group having 1 to 30 carbon atoms, preferably 1 to 20 carbon atoms. R$^6$ is a monovalent hydrocarbon group having 1 to 30 carbon atoms and is, for example, a unsubstituted or substituted branched or non-branched alkyl group, an alkenyl group, an aryl group, or an aralkyl group, which has 1 to 20 carbon atoms.

R$^7$ is a monovalent hydrocarbon group having 1 to 30 carbon atoms or a group represented by (R$^8$)$_3$Si— and is, for example, a methyl group, an ethyl group, a branched or non-branched alkyl group, an alkenyl group, an aryl group, or an aralkyl group which has 3 to 30 carbon atoms. R$^8$ is a branched or non-branched alkyl group having 1 to 30 carbon atoms or an alkenyl group.

R$^3$ is a monovalent hydrocarbon group having 1 to 30 carbon atoms and is, for example, a methyl group, an ethyl group, a branched or non-branched alkyl group, an alkenyl group, an aryl group, or an aralkyl group which has having 3 to 30 carbon atoms.

R$^4$ is a divalent hydrocarbon group having 1 to 30 carbon atoms and is a branched or non-branched saturated or unsaturated aliphatic, aromatic, or aliphatic/aromatic-mixed divalent hydrocarbon group having 1 to 30 carbon atoms.

Examples of the first hydrocarbyloxysilane compound having a nitrogen-containing group formed by substituting two protective groups for two hydrogen atoms of a primary amino group, a nitrogen-containing group formed by substituting one protective group for one hydrogen atom of a secondary amino group, a tertiary amino group, an imino group, a pyridyl group, a phosphorus-containing group formed by substituting two protective groups for two hydrogen atoms of a primary phosphino group, a phosphorus-containing group formed by substituting one protective group for one hydrogen atom of a secondary phosphino group, a tertiary phosphino group, or a sulfur-containing group formed by substituting one protective group for one hydrogen atom of a thiol and the functional group (a) include compounds in which R$^1$ in the above formula (I) is one selected from the group consisting of —O—(C$_2$H$_4$—O)$_5$—C$_8$H$_{17}$, —O—(C$_2$H$_4$—O)$_5$—C$_{10}$H$_{21}$, —O—($C_2H_4$—O)$_5$—$C_{11}H_{23}$, —O—($C_2H_4$—O)$_5$—$C_{12}H_{25}$, —O—($C_2H_4$—O)$_5$—$C_{13}H_{27}$, —O—($C_2H_4$—O)$_5$—$C_{14}H_{29}$, —O—($C_2H_4$—O)$_5$—$C_{15}H_{31}$, —O—($C_2H_4$—O)$_5$—$C_{16}H_{33}$, —O—($C_2H_4$—O)$_5$—$C_{18}H_{37}$, —O—($C_2H_4$—O)$_5$—$C_{18}H_{35}$, —O—($C_2H_4$—O)$_3$—$C_8H_{17}$, —O—($C_2H_4$—O)$_3$—$C_{10}H_{21}$, —O—($C_2H_4$—O)$_3$—$C_{11}H_{23}$, —O—($C_2H_4$—O)$_3$—$C_{12}H_{25}$, —O—($C_2H_4$—O)$_3$—$C_{13}H_{27}$, —O—($C_2H_4$—O)$_3$—$C_{14}H_{29}$, —O—($C_2H_4$—O)$_3$—$C_{15}H_{31}$, —O—($C_2H_4$O)$_3$—$C_{16}H_{33}$, —O—($C_{16}H_4$—O)$_3$—$C_{18}H_{37}$, —O—($C_2H_4$—O)$_3$—$C_{18}H_{35}$, —O—($C_2H_4$—O)$_4$—$C_8H_{17}$, —O—($C_2H_4$—O)$_4$—$C_{10}H_{21}$, —O—($C_2H_4$—O)$_4$—$C_{11}H_{23}$, —O—($C_2H_4$—O)$_4$—$C_{12}H_{25}$, —O—($C_2H_4$—O)$_4$—$C_{13}H_{27}$, —O—($C_2H_4$—O)$_4$—$C_{14}H_{29}$, —O—($C_2H_4$—O)$_4$—$C_{15}H_{31}$, —O—($C_2H_4$—O)$_4$—$C_{16}H_{33}$, —O—($C_2H_4$—O)$_4$—$C_{18}H_{37}$, and —O—($C_2H_4$—O)$_4$—$C_{18}H_{35}$; $R^2$ is the same as $R^1$ or is one selected from the group consisting of a methyl group, an ethyl group, an isopropyl group, an isobutyl group, a methoxy group, an ethoxy group, an isopropoxy group, and an isobutoxy group; $R^3$ is one selected from the group consisting of a methyl group, an ethyl group, an isopropyl group, and an isobutyl group; $R^4$ is one selected from the group consisting of a methylene group, an ethylene group, a propylene group, and a butylene group; and X is one selected from the group consisting of an N,N-bis(trimethylsilyl)amino group, an N,N-bis(triethylsilyl)amino group, an N,N',N'-tris(trimethylsilyl)-N-(2-aminoethyl)amino group, an N,N',N'-tris(triethylsilyl)-N-(2-aminoethyl)amino group, a 2,2,5,5-tetramethyl-1-aza-2,5-disilacyclopentyl group, an N,N'-diethyl-N'-trimethylsilyl-ethane-1,2-diamino group, an N,N'-dimethyl-N'-trimethylsilyl-ethane-1,2-diamino group, an N,N'-diethyl-N'-triethylsilyl-ethane-1,2-diamino group, an N,N'-dimethyl-N'-triethylsilyl-ethane-1,2-diamino group, an N,N'-diethyl-N'-trimethylsilyl-p-phenylenediamino group, an N,N'-dimethyl-N'-trimethylsilyl-p-phenylenediamino group, an N,N'-diethyl-N'-triethylsilyl-p-phenylenediamino group, an N,N'-dimethyl-N'-triethylsilyl-p-phenylenediamino group, a 3-(trimethylsilylethylamino)-1-pyrrolidinyl group, a 3-(trimethylsilylpropylamino)-1-pyrrolidinyl group, an N-ethyl-N'-(2-ethoxyethyl)-N'-trimethylsilyl-ethane-1,2-diamino group, an N-methyl-N'-(2-ethoxyethyl)-N'-trimethylsilyl-ethane-1,2-diamino group, an N-ethyl-N'-(2-methoxyethyl)-N'-trimethylsilyl-ethane-1,2-diamino group, an N-methyl-N'-(2-methoxyethyl)-N'-trimethylsilyl-ethane-1, 2-diamino group, an N-ethyl-N'-(2-ethoxyethyl)-N'-triethylsilyl-ethane-1,2-diamino group, an N-methyl-N'-(2-ethoxyethyl)-N'-triethylsilyl-ethane-1,2-diamino group, an N-ethyl-N'-(2-methoxyethyl)-N'-triethylsilyl-ethane-1,2-diamino group, an N-methyl-N'-(2-methoxyethyl)-N'-triethylsilyl-ethane-1,2-diamino group, a 4-methyl-1-piperadino group, a 4-ethyl-1-piperadino group, a 4-trimethylsilyl-1-piperadino group, a 4-triethylsilyl-1-piperadino group, a 3-trimethylsilyl-1-imidazolidinyl group, a 3-triethylsilyl-1-imidazolidinyl group, a 3-trimethylsilyl-1-hexahydropyrimidinyl group, a 3-triethylsilyl-1-hexahydropyrimidinyl group, an N,N',N'-trimethylpropane-1,3-diamino group, an N,N',N'-triethylpropane-1,3-diamino group, an N-ethyl-N',N'-dimethylpropane-1,3-diamino group, an N',N'-diethyl-N-methylpropane-1,3-diamino group, an N,N'-diethyl-N'-methylpropane-1,3-diamino group, a 3-diethylamino group, a 3-dimethylamino group, a 3-ethylmethylamino group, a 3-morpholino group, a 3-piperidino group, an N-(1,3-dimethylbutylidene)-1-propanamino group, an N-(1,3-methylethylidene)-1-propanamino group, an N-ethylidene-1-propanamino group, an N-(1-methylpropylidene)-1-propanamino group, an N-(4-N, N-dimethylaminobenzylidene)-1-propanaminogroup, an N-(cyclohexylidene)-1-propanamino group, a 3-hexamethyleneimino group, a P,P-bis(trimethylsilyl)phosphino group, a P,P-bis(triethylsilyl)phosphino group, a 3-dimethylphosphino group, a 3-diethylphosphino group, a 3-ethylmethylphosphino group, a 3-diphenylphosphino group, an S-trimethylsilylmercapto group, an S-triethylsilylmercapto group, an S-methylmercapto group, and an S-ethylmercapto group.

By reacting the conjugated diene polymer having an alkali metal or alkaline-earth metal active end with a first hydrocarbyloxysilane compound, the site of the alkali metal or alkaline-earth metal active end is reacted with one site of the hydrocarbyloxy groups, by which a modified conjugated diene polymer having the functional group (a) and the functional group (b) can be obtained. Additionally, the first alkoxysilane compound described above can react with a conjugated diene polymer having an alkali metal or alkaline-earth metal active end and also reacts or interacts with carbon black and/or silica both acting as a reinforcing agent when they are made into a rubber composition to impart an excellent low hysteresis-loss property when they are made into a crosslinked rubber. From the viewpoint, even if some of the first hydrocarbyloxysilane compounds are not described in Examples to be mentioned later, they can be used in the present invention.

The modification reaction for introducing such a first hydrocarbyloxysilane compound into the alkali metal or alkaline-earth metal active end of a conjugated diene polymer can be performed, e.g., in solution reaction (wherein the solution used here may be a solution containing monomers which remain unreacted at polymerization time). The modification reaction has no particular limitation as to its form, and it may be carried out by using a batch-type reactor or it may be carried out in a continuous mode by using an instrument such as a multistage continuous reactor or an in-line mixer. Additionally, it is preferable that the modification reaction is performed in advance of various operations required for solvent removal treatment, water treatment, heat treatment, and isolation of the polymer after completion of the polymerization reaction.

The amount of the first alkoxysilane compound to be used in the modification reaction is preferably 0.1 molar equivalents or more and more preferably 0.3 molar equivalents or more relative to the active site of the conjugated diene polymer obtained by anionic polymerization. When the amount is 0.1 molar equivalents or more, the progress of the modification reaction is adequate and the ability to disperse a reinforcing agent is sufficiently improved. Also, when the modification reaction product is made into a crosslinked rubber, the rubber is excellent in tensile strength, abrasion resistance, wet skid resistance, and low hysteresis-loss property.

In this connection, the method for adding the first hydrocarbyloxysilane compound as a modifier has no particular limitation, and examples thereof include a method of addition by one operation, a method of addition dividedly, and a method of continuous addition. Of these methods, the method of addition by one operation is preferred. Furthermore, the first alkoxysilane compound may be added in the form of a solution containing a conjugated diene monomer, an aromatic vinyl compound, a hydrocarbon solvent, or a randomizer as exemplified in the present description or the like as a solvent.

As a temperature for the modification reaction, the polymerization temperature of a conjugated diene polymer can be utilized just as it is. Specifically, the temperature is preferably from 0 to 120° C. and more preferably 20 to 100° C. Decrease in temperature tends to cause an increase in polymer viscosity, whereas increase in temperature tends to cause deactivation of the polymerization active end. Therefore, the temperatures falling within the numerical range specified above are preferable. Additionally, the reaction time in the primary modification reaction is preferably from 1 minute to 5 hours and more preferably from 2 minutes to 1 hour.

On the occasion of production of the conjugated diene polymer, a coupling agent can be also added in combination with the first alkoxysilane compound. Examples of the coupling agent are as follows. The coupling agent is added at the stage of modifying the conjugated diene polymer with the first hydrocarbyloxysilane compound as described above.

Namely, the coupling agent made to react on the polymerization active end in combination with the first hydrocarbyloxysilane compound includes at least one kind of compound selected from the group consisting of (a) an isocyanate compound and/or an isothiocyanate compound, (b) an amide compound and/or an imide compound, (c) a pyridyl-substituted ketone compound and/or a pyridyl-substituted vinyl compound, (d) a silicon compound, (e) an ester compound, (f) a ketone compound, (g) a tin compound, (h) an epoxy compound, (i) a phosphate ester compound, (j) a compound containing an acid anhydride group, (k) a compound containing an arylvinyl group, and (l) a compound containing a halogenated carbon group.

Among the compounds, suitable examples of the isocyanate or isothiocyanate compound of the component (a) include 2,4-tolylene diisocyanate, 2,6-tolylene diisocyanate, diphenylmehtane diisocyanate, diphenylethane diisocyanate, polymeric-type diphenylmethane diisocyanate (C-MDI), isophorone diisocyanate, hexamethylene diisocyante, 1,3,5-benzene triisocyanate, phenyl-1,4-diisothiocyanate, and the like.

Suitable examples of the amide or imide compound of the component (b) include amide compounds such as succinamide, phthalamide, N,N,N',N'-tetramethylphthalamide, oxamide, N,N,N',N'-tetramethyloxamide, adipic acid bisdimethylamide and polymethacrylic acid dimethylamide, and imide compounds such as succinimide, N-methylsuccinimide, maleimide, N-methylmaleimide, phthalimide, and N-methylphthalimide.

Suitable examples of the pyridyl-substituted ketone or pyridyl-substituted vinyl compound of the component (c) include dibenzoylpyridine, diacetylpyridine, divinylpyridine, and the like.

Suitable examples of the silicon compound of the component (d) include dibutyldichlorosilane, methyltrichlorosilane, methyldichlorosilane, tetrachlorosilane, silicon tetrabromide, silicon tetraiodide, monochlorotrimethoxysilane, monobromotrimethoxysilane, dichlorodimethoxysilane, dibromodimethoxysilane, trichloromethoxysilane, tribromomethoxysilane, hexachlorodisilane, bis(trichlorosilyl)methane, 1,2-bis(trichlorosilyl)ethane, 1,3-bis(trichlorosilyl)propane, 1,4-bis(trichlorosilyl)butane, 1,5-bis(trichlorosilyl)pentane, 1,6-bis(trichlorosilyl)hexane, triethoxymethylsilane, triphenoxymethylsilane, trimethoxysilane, methyltriethoxysilane, tetramethoxysilane, tetraethoxysilane, tetrabutoxysilane, 3-acetylpropoxytrimethoxysilane, N-(1,3-dimethylbutylidene)-3-(triethoxysilyl)-1-propanamine, N-(1,3-dimethylbutylidene)-3-(tributoxysilyl)-1-propanamine, N-(1-methylpropylidene)-3-(triethoxysilyl)-1-propanamine, N-ethylidene-3-(triethoxysilyl)-1-propanamine, N-(3-triethoxysilylpropyl)-4,5-dihydroimidazole, 3-chloropropoxytrimethoxysilane, 4,5-epoxyheptylmethyldimethoxysilane, bis(triethoxysilylpropyl)tetrasulfide, and the like.

Suitable examples of the ester compound of the component (e) include dimethyl adipate, diethyl adipate, dimethyl terephthalate, diethyl terephthalate, dimethyl phthalate, dimethyl isophthalate, diethyl malonate, diethyl phthalate, diethyl glutarate, diethyl maleate, and the like.

Suitable examples of the ketone compound of the component (f) include N,N,N',N'-tetramethyl-4,4'-diaminobenzophenone, N,N,N',N'-tetraethyl(4,4'-diamino)-benzophenone, N,N-dimethyl-1-aminobenzoquinone, N,N,N',N'-tetramethyl-1,3-diaminobenzoquinone, N,N-dimethyl-1-aminoanthraquinone, N,N,N',N'-tetramethyl-1,4-diaminoanthraquinone, 4,4'-diacetylbenzophenone, and the like.

Suitable examples of the tin compound of the component (g) include tetrachlorostannate, tetrabromostannate, trichlorobutylstannate, trichloromethylstannate, trichloroethylstannate, trichlorophenylstannate, trichlorooctylstannate, dibromodimethylstannate, dichlorodimethylstannate, dichlorodibutylstannate, dichlorodioctylstannate, 1,2-bis(trichlorostannyl)ethane, 1,2-bis(methyldichlorostannyl)ethane, 1,4-bis(trichlorostannyl)butane, 1,4-bis(methyldichlorostannyl)butane, ethyltin tristearate, butyltin trisoctanoate, butyltin trisstearate, butyltin trislaurate, dibutyltin bisoctanoate, dibutyltin bisstearate, dibutyltin bislaurate, and the like.

Suitable examples of the epoxy compound of the component (h) include polyglycidyl ethers of polyhydric alcohols, such as ethylene glycol diglycidyl ether and glycerin triglycidyl ether, polyglycidyl ethers of aromatic compounds having two or more phenyl groups, such as diglycidylated bisphenol A, polyepoxy compounds such as 1,4-diglycidylbenzene, 1,3,5-triglycidylbenzene and polyepoxidated liquid polybutadiene, epoxy group-containing tertiary amines such as 4,4'-diglycidyl-diphenylmethylamine and 4,4'-diglycidyl-dibenzylmethylamine, glycidylamino compounds such as diglycidylaniline, diglycidyl-ortho-toluidine, tetraglycidyl-meta-xylenediamine, tetraglycidylaminodiphenylmethane, tetraglycidyl-p-phenylenediamine, diglycidylaminomethylcyclohexane and tetraglycidyl-1,3-bisaminomethylcyclohexane, compounds having epoxy groups and other functional groups, such as 3-glycidoxypropyltrimethoxysilane, 3-glycidoxypropyltriethoxysilane, 3-glycidoxypropyltributoxysilane, epoxy-modified silicones, epoxidized soybean oil and epoxidized linseed oil, and the like.

Suitable examples of the phosphate ester compound of the component (i) include polyhalogenated phosphorus compounds such as trichlorophosphine and tribromophosphine, and phosphite compounds such as trisnonylphenyl phosphite, trimethyl phosphite and triethyl phosphite, trimethyl phosphate, triethyl phosphate, and the like.

Suitable examples of the compound containing an acid anhydride group of the component (j) include pyromellitic anhydride, a styrene-maleic anhydride copolymer, and the like.

Suitable examples of the compound containing an arylvinyl group of the component (k) include divinylbenzene, diisopropenylbenzene, divinylbenzene oligomers, and the like.

Suitable examples of the compound containing a halogenated carbon group of the component (l) include trichloropropane, tribromopropane, tetrachlorobutane, and the like.

These compounds made to react on polymerization active ends in combination with first alkoxysilane compounds may be used alone, or two or more of them may be used in combination.

The amount of the above coupling agent to be used is 1 mol or less and preferably from 0.1 to 0.5 mol, in terms of the amount of a substituent capable of coupling in the coupling agent, per gram-atomic equivalent of the alkali metal or alkaline-earth metal constituting the polymerization initiator. When the amount is more than 1 mol, the reaction conversion rate of the first hydrocarbyloxysilane compound is lowered, and an excellent low hysteresis-loss property and the like are sometimes not attained when a crosslinked rubber is formed.

[Step (b)]

The production method of the present invention can further include (B) a step of mixing the modified conjugated diene rubber obtained in the preceding step with an onium-forming agent.

Examples of the onium-forming agent to be used in the step (B) include metal halides such as a silicon halide compound, a tin halide compound, an aluminum halide compound, a titanium halide compound, a zirconium halide compound, a germanium halide compound, a gallium halide compound, and a zinc halide compound; a sulfate ester, a phosphate ester, a carbonate ester, a nitrate ester; inorganic acids such as hydrofluoric acid, hydrochloric acid, hydrobromic acid, hydroiodic acid, sulfuric acid, nitric acid, carbonic acid, and phosphoric acid; salts of inorganic acids, such as potassium fluoride, tetramethylammonium fluoride, and tetra-n-butylammonium fluoride; organic acids such as a carboxylic acid and a sulfonic acid; and the like. These compounds may be used alone, or two or more of them may be used in combination.

Examples of compounds for the onium-forming agent include tetrachlorosilane, tetrachlorostannane, trimethylsilyl chloride, dimethyldichlorosilane, methyltrichlorosilane, methyldichlorosilane, diethylaluminum chloride, ethylaluminum sesquichloride, ethylaluminum dichloride, titanium tetrachloride, titanocene dichloride, zirconium tetrachloride, zirconocene dichloride, germanium tetrachloride, gallium trichloride, zinc chloride, diethyl sulfate, dimethyl sulfate, magnesium laureth sulfate, trimethyl phosphate, triethyl phosphate, tributyl phosphate, 2-ethylhexyl phosphate, triphenyl phosphate, tricresyl phosphate, dimethyl carbonate, diethyl carbonate, ethylene carbonate, propylene carbonate, nitrocellulose, nitroglycerin, nitroglycol, formic acid, acetic acid, oxalic acid, maleic acid, citric acid, malic acid, fumaric acid, malonic acid, acrylic acid, crotonic acid, succinic acid, glutaric acid, itaconic acid, tartaric acid, sebacic acid, terephthalic acid, isophthalic acid, β-mercaptopropionic acid, benzenesulfonic acid, p-toluenesulfonic acid, hydrofluoric acid, hydrochloric acid, hydrobromic acid, hydroiodic acid, sulfuric acid, nitric acid, carbonic acid, phosphoric acid, potassium fluoride, tetramethylammonium fluoride, tetra-n-butylammonium fluoride, and the like.

Mixing of the onium-forming agent and the modified conjugated diene polymer obtained in the preceding step can be performed, for example, in a solution. The mixing has no particular limitation as to its mode, and it may be carried out by using a batch-type mixer or it may be carried out in a continuous mode by using an apparatus such as a multistage continuous mixer or an in-line mixer.

The amount of the onium-forming agent to be used is preferably 1.0 molar equivalent or more and more preferably 1.5 molar equivalents or more relative to the group convertible into an onium present in the reaction system. When the amount is more than 1.0 molar equivalent, the progress of conversion into the onium is adequate and the shape-retaining property of the rubber is excellent.

The method for adding the onium-forming agent is not particularly limited, and examples thereof include a method of addition by one operation, a method of addition dividedly, and a method of continuous addition. Of these methods, the method of addition by one operation is preferred. Moreover, the onium-forming agent may be added in the form of a solution containing as a solvent such a hydrocarbon solvent as exemplified in the present description or such a randomizer as exemplified in the present description, or the like.

As a temperature at which the onium-forming agent is mixed with the modified conjugated diene polymer obtained in the preceding step, the polymerization temperature of the conjugated diene polymer can be utilized just as it is. The temperature is preferably from 0 to 120° C. and more preferably 20 to 100° C. Decrease in the temperature tends to cause an increase in polymer viscosity, whereas increase in the temperature tends to cause deterioration of the polymerization active end.

Therefore, the temperature falling outside the numerical range specified above is unpreferable. Moreover, the mixing time is preferably from 1 minute to 5 hours and more preferably from 2 minutes to 1 hour.

In this connection, in the method for producing a modified conjugated diene rubber of the present invention, the modified conjugated diene rubber can be collected, after addition of the onium-forming agent, by conducting solvent-removal (e.g. steam stripping or the like) and drying operations which are known in the production of conjugated diene polymers.

[Step (C)]

The method for producing a modified conjugated diene rubber of the present invention can also further include (C) a step of mixing the modified conjugated diene rubber obtained in the preceding step with a catalyst (hereinafter also simply referred to as "condensation catalyst") containing a metal element for condensing the hydrocarbyloxysilane compound, for the purpose of enhancing the reactivity with a filler.

As the condensation catalyst, a metallic compound which contains at least one metal element among metal elements included in the group 4, the group 12, the group 13, the group 14, and the group 15 of the periodic table is preferable. Suitable examples of the metal element include titanium, zirconium, aluminum, bismuth tin, and the like.

Moreover, as the condensation catalyst, alkoxides, carboxylate salts, or acetylacetonate complex salts of the metal elements described above are preferable.

The condensation catalyst accelerates reaction or interaction of the alkoxysilyl groups and the groups convertible into oniums which are derived from first alkoxysilane compounds or the alkoxysilyl groups and the groups convertible into oniums which are derived from second alkoxysilane compounds, which are introduced into the conjugated diene polymer, with carbon black and/or silica acting as a reinforcing agent at the time of forming a rubber composition, thereby imparting an excellent low hysteresis-loss property at the time of forming a crosslinked rubber.

Furthermore, the condensation catalyst can accelerate the condensation of the modified conjugated diene polymer and the catalyst itself also can further enhance the reactivity with a filler through the reaction with at least either one of the hydrocarbyloxy groups in the modified conjugated diene rubber and the second hydrocarbyloxysilane compound.

From the viewpoints, even if some of the condensation catalysts are not described in Examples to be mentioned later, they can be used in the present invention.

Examples of the condensation catalyst include tetramethoxytitanium, tetraethoxytitaniume, tetra-n-propoxytitanium, tetra-i-propoxytitanium, tetra-n-butoxytitanium, tetra-n-butoxytitanium oligomer, tetra-sec-butoxytitanium, tetra-tert-butoxytitanium, tetra(2-ethylhexyloxy)titanium, bis(octanedioleato)bis(2-ethylhexyloxy)titanium, tetra(octanedioleato)titanium, titanium lactate, titanium dipropoxide bis(triethanolaminate), titanium dibutoxide bis(triethanolaminate), titanium dibutoxide bis(triethanolaminate), titanium tributoxide stearate, titanium tripropoxide stearate, titanium tripropoxide acetylacetonate, titanium dipropoxide bis(acetylacetonate), titanium tripropoxide ethylacetoacetate, titanium propoxide acetylacetonate bis(ethylacetoacetate), titanium tributoxide acetylacetonate, titanium dibutoxide bis(acetylacetonate), titanium tributoxide ethylacetoacetate, titanium butoxide acetylacetonate bis(ethylacetoacetate), titanium tetrakis(acetylacetonate), and titanium diacetylacetonate bis(ethylacetoacetate).

In addition, examples thereof include bis(2-ethylhexanoato)titanium oxide, bis(laurato)titanium oxide, bis(naphthato)titanium oxide, bis(stearato)titanium oxide, bis(oleato)titanium oxide, bis(linoleato)titanium oxide, tetrakis(2-ethylhexanoato)titanium, tetrakis(laurato)titanium, tetrakis(naphthato)titanium, tetrakis(stearato)titanium, tetrakis(oleato)titanium, tetrakis(linoleato)titanium, tris(2-ethylhexanoato)bismuth, tris(laurato)bismuth, tris(naphthato)bismuth, tris(stearato)bismuth, tris(oleato)bismuth, and tris(linoleato)bismuth.

Moreover, examples thereof include tetraethoxyzirconium, tetra-n-propoxyzirconium, tetra-1-propoxyzirconium, tetra-n-butoxyzirconium, tetra-sec-butoxyzirconium, tetra-tert-butoxyzirconium, tetra(2-ethylhexyl)zirconium, zirconium tributoxide stearate, zirconium tributoxide acetylacetonate, zirconium dibutoxide bis(acetylacetonate), zirconium tributoxide ethylacetoacetate, zirconium butoxide acetylacetonate bis(ethylacetoacetate), zirconium tetrakis(acetylacetonate), zirconium diacetylacetonate bis(ethylacetoacetonate), bis(2-ethylhexanoato)zirconium oxide, bis(laurato)zirconium oxide, bis(naphthato)zirconium oxide, bis(stearato)zirconium oxide, bis(oleato)zirconium oxide, bis(linoleato)zirconium oxide, tetrakis(2-ethylhexanoato)zirconium, tetrakis(laurato)zirconium, tetrakis(naphthato)zirconium, tetrakis(stearato)zirconium, tetrakis(oleato)zirconium, tetrakis(linoleato)zirconium, and the like.

Furthermore, examples thereof include triethoxyaluminum, tri-n-propoxyaluminum, tri-1-propoxyaluminum, tri-n-butoxyaluminum, tri-sec-butoxyaluminum, tri-tert-butoxyaluminum, tri(2-ethylhexyl)aluminum, aluminum dibutoxide stearate, aluminum dibutoxide acetylacetonate, aluminum butoxide bis(acetylacetonate), aluminum dibutoxide ethylacetoacetate, aluminum tris(acetylacetonate), aluminum tris(ethylacetoacetate), tris(2-ethylhexanoato)aluminum, tris(laurato)aluminum, tris(naphthato)aluminum, tris(stearato)aluminum, tris(oleato)aluminum, tris(linoleato)aluminum, bis(n-octanoato)tin, bis(2-ethylhexanoato)tin, tin dilaurate, tin dinaphthoenate, tin distearate, tin dioleate, dibutyltin diacetate, dibutyltin bis(n-octanoate), dibutyltin bis(2-ethylhexanoate), dibutyltin dilaurate, dibutyltin malate, dibutyltin bis(benzylmalate), dibutyltin bis(2-ethylhexylmalate), di-n-octyltin diacetate, di-n-octyltin bis(n-octanoate), di-n-octyltin bis(2-ethylhexanoate), di-n-octyltin dilaurate, di-n-octyltin malate, di-n-octyltin bis(benzylmalate) and di-n-octyltin bis(2-ethylhexylmalate).

Of these condensation catalysts, tetrakis(2-ethylhexyloxy)titanium, tetra(octanedioleato)titanium, tris(2-ethylhexanoato)bismuth, tetra-n-propoxyzirconium, tetra-n-butoxyzirconium, bis(2-ethylhexanoato)zirconium oxide, bis(oleato)zirconium oxide, tri-1-propoxyaluminum, tri-sec-butoxyaluminum, tris(2-ethylhexanoato)aluminum, tris(stearato)aluminum, zirconium tetrakis(acetylacetonate), aluminum tris(acetylacetonate), bis(2-ethylhexanoato)tin, and di-n-octyltin bis(2-ethylhexylmalate) can be mentioned as suitable examples.

In the mixing, the amount of such a catalyst containing a metal element to be used for condensation of hydrocarbyloxysilane compounds is preferably from 0.1 to 10 molar equivalents and more preferably from 0.2 to 5 molar equivalents relative to the hydrocarbyloxy group present in the reaction system. When the amount is smaller than 0.1 molar equivalents, the progress of the condensation reaction is sometimes not adequate. On the other hand, the use of the condensation catalyst in an amount larger than 10 molar equivalents is unpreferable from an economic point of view because the effect of the condensation catalyst in the reaction has already come to saturation.

In this connection, the method for adding the condensation catalyst as a modifier is not particularly limited, and examples thereof include a method of addition by one operation, a method of addition in fractional amounts, and a method of continuous addition. Of these methods, the method of addition by one operation is preferred. Additionally, the condensation catalyst may be added in the form of a solution containing as solvent such a hydrocarbon solvent as described in the present description, such a randomizer as described in the present description, or the like.

A temperature for mixing the condensation catalyst with the modified conjugated diene polymer obtained in the preceding step is preferably from 0 to 120° C. and more preferably from 20 to 100° C. Decrease in the temperature tends to cause an increase in polymer viscosity, whereas increase in the temperature tends to cause deterioration of the polymerization active end. Therefore, a temperature falling within the numerical range specified above is preferable.

Moreover, a mixing time is preferably from 1 minute to 5 hours, and more preferably from 2 minutes to 1 hour. The mixing time shorter than 1 minute does not allow completion of mixing, while the mixing time longer than 5 hours is wasteful since the mixing has already reached saturation.

[Step (D)]

The method for producing a modified conjugated diene rubber of the present invention may further contain (D) a step of mixing the modified conjugated diene rubber obtained in the preceding step with a second hydrocarbyloxysilane compound having a group convertible into an onium, for the purpose of further enhancing the low hysteresis-loss property, tensile strength, abrasion resistance, and wet skid resistance.

The number of the hydrocarbyloxy group in the second hydrocarbyloxysilane compound is 1 or more and, in terms of reaction efficiency, is preferably 2 or 3 and more preferably 3. Moreover, in the case where 2 or more hydrocarbyloxy groups are present, the reactivity with a filler can be further enhanced by reacting both of the modified conjugated diene polymer and the condensation catalyst.

Examples of the group convertible into an onium, which is present in the second hydrocarbyloxysilane compound, include a primary amino group, a secondary amino group, a tertiary amino group, an imino group, a pyridyl group, a primary phosphino group, a secondary phosphino group, a tertiary phosphino group, a thiol group, and the like. The second hydrocarbyloxysilane compounds may be used alone, or two or more of them may be used in combination.

Examples of a compound having a primary amino group, a secondary amine group, or a tertiary amino group and a hydrocarbyloxy group include N,N-bis(trimethylsilyl)aminopropylmethyldimethoxysilane, N,N-bis(trimethylsilyl)aminopropyltrimethoxysilane, N,N-bis(trimethylsilyl)aminopropyltriethoxysilane, N,N-bis(trimethylsilyl)aminopropylmethyldiethoxysilane, N,N-bis(trimethylsilyl)aminoethyltrimethoxysilane, N,N-bis(trimethylsilyl)aminoethyltriethoxysilane, N,N-bis(trimethylsilyl)aminoethylmethyldimethoxysilane, N,N-bis(trimethylsilyl)aminoethylmethyldiethoxysilane, N,N-bis(triethylsilyl)aminopropylmethyldimethoxysilane, N,N-bis(triethylsilyl)aminopropyltrimethoxysilane, N,N-bis(triethylsilyl)aminopropyltriethoxysilane, N,N-bis(triethylsilyl)aminopropylmethyldiethoxysilane, N,N-bis(triethylsilyl)

aminoethyltrimethoxysilane, aminoethyltriethoxysilane, aminoethylmethyldimethoxysilane, aminoethylmethyldiethoxysilane, N,N'-tris(trimethylsilyl)-N-(2-aminoethyl)-3-aminopropyltriethoxysilane, N,N',N'-tris(trimethylsilyl)-N-(2-aminoethyl)-3-aminopropylmethyldiethoxysilane, N,N',N'-tris(trimethylsilyl)-N-(2-aminoethyl)-3-aminopropyltrimethoxysilane, N,N',N'-tris(trimethylsilyl)-N-(2-aminoethyl)-3-aminopropylmethyldimethoxysilan, 1-(3-triethoxysilylpropyl)-2,2,5,5-tetramethyl-1-aza-2,5-disilacyclopentane, 1-(3-trimethoxysilylpropyl)-2,2,5,5-tetramethyl-1-aza-2,5-disilacyclopentane, 1-(3-methyldiethoxysilylpropyl)-2,2,5,5-tetramethyl-1-aza-2,5-disilacyclopentane, 1-(3-methyldimethoxysilylpropyl)-2,2,5,5-tetramethyl-1-aza-2,5-disilacyclopentane, 1-trimethylsilyl-2,2-dimethoxy-1-aza-2-silacyclopentane, N-[3-(trimethoxysilyl)-propyl]-N,N'-diethyl-N'-trimethylsilyl-ethane-1,2-diamine, N-[3-(triethoxysilyl)-propyl]-N,N'-diethyl-N'-trimethylsilyl-ethane-1,2-diamine, N-[3-(methyldimethoxysilyl)-propyl]-N,N'-diethyl-N'-trimethylsilyl-ethane-1,2-diamine, N-[3-(methyldimethoxysilyl)-propyl]-N,N-diethyl-N-trimethylsilyl-p-phenylenediamine, N-[3-(triethoxysilyl)-propyl]-N,N-diethyl-N-trimethylsilyl-p-phenylenediamine, 3-[3-(trimethylsilylethylamino)-1-pyrrolidinyl]-propyl-methyldiethoxysilane, 3-[3-(trimethylsilylpropylamino)-1-pyrrolidinyl]-propyl-triethoxysilane, N-[3-(diethoxymethylsilyl)-propyl]-N-ethyl-N'-(2-ethoxyethyl)-N'-trimethylsilyl-ethane-1,2-diamine, N-[3-(tripropoxysilyl)-propyl]-N-propyl-N'-(2-ethoxyethyl)-N'-triethylsilyl-p-phenylenediamine, N-[2-(diethoxymethylsilyl)-1-methylethyl]-N-ethyl-N'-(2-diethylamino-ethyl)N-triethylsilyl-ethane-1,2-diamine, N-[3-(triethoxysilyl)-propyl]-N-ethyl-N'-(2-diethylaminoethyl)-N'-triethylsilyl-ethane-1,2-diamine, 3-(4-trimethylsilyl-1-piperazino)propylmethyldimethoxysilane, 3-(4-trimethylsilyl-1-piperazino)propyltriethoxysilane, 3-(4-trimethylsilyl-1-piperazino)propyltributoxysilane, 3-(3-trimethylsilyl-1-imidazolidinyl)propylethyldiethoxysilane, 3-(3-trimethylsilyl-1-imidazolidinyl)-propyltriethoxysilane, 3-(3-trimethylsilyl-1-hexahydropyrimidinyl)propylmethyldimethoxysilane, 3-(3-trimethylsilyl-1-hexahydropyrimidinyl)propyltriethoxysilane, 4-(4-trimethylsilyl-1-piperazinyl)butyltriethoxysilane, N-[2-(trimethoxysilyl)-ethyl]-N,N',N'-trimethylethane-1,2-diamine, N-[2-(dimethoxymethylsilyl)-ethyl]-N-ethyl-N',N'-dimethylethane-1,2-diamine, N-[3-(trimethoxysilyl)-propyl]-N',N',N'-trimethylpropane-1,3-diamine, N-[3-(dimethoxymethylsilyl)-propyl]-N-ethyl-N',N'-dimethylpropane-1,3-diamine, N-[3-(triethoxysilyl)-propyl]-N,N',N'-triethyl-2-methylpropane-1,3-diamine, N-[3-(dimethoxymethylsilyl)-propyl]-2,N,N',N'-tetramethylpropane-1,3-diamine, N-(2-dimethylaminoethyl)-N'-[2-(trimethoxysilyl)-ethyl]-N,N'-dimethylethane-1,2-diamine, N-[2-(diethoxyprorylsilyl)-ethyl]-N'-(3-ethoxypropyl)-N,N'-dimethane-1,2-diamine, N-[2-(trimethoxysilyl)-ethyl]-N'-methoxymethyl-N,N-dimethylethane-1,2-diamine, N-[2-(trimethoxysilyl)-ethyl]-N,N'-dimethyl-N'-(2-trimethylsilylethyl)-ethane-1,2-diamine, N-[2-(triethoxysilyl)-ethyl]-N,N'-diethyl-N'-(2-dibutylmethoxysilylethyl)-ethane-1,2-diamine, 1-[3-(triethoxysilyl)-propyl]-4-methylpiperazine, 1-[3-(diethoxyethylsilyl)-propyl]-4-methylpiperazine, 1-[3-(trimethoxysilyl)-propyl]-4-methylpiperazine, 1-[3-(diethoxyethylsilyl)-propyl]-4-methylpiperazine, 1-[3-(dimethoxymethylsilyl)-propyl]-4-methylpiperazine, 1-[3-(trimethoxysilyl)-propyl]-3-methylimidazolidine, 1-[3-(diethoxyethylsilyl)-propyl]-3-ethylimidazolidine, 1-[3-(triethoxysilyl)-propyl]-3-methylhexahydropyrimidine, 1-[3-(dimethoxymethylsilyl)-propyl]-3-methylhexahydropyrimidine, 3-[3-(tributoxysilyl)-propyl]-1-methyl-1,2,3,4-tetrahydropyrimidine, 3-[3-(dimethoxymethylsilyl)-propyl]-1-ethyl-1,2,3,4-tetrahydropyrimidine, 1-(2-ethoxyethyl)-3-[3-(trimethoxysilyl)-propyl]-imidazolidine, 2-{3-[3-(trimethoxysilyl)-propyl]-tetrahydropyrimidine-1-yl}-ethyldimethylamine, 2-(trimethoxysilyl)-1,3-dimethylimidazolidine, 2-(diethoxyethylsilyl)-1,3-diethylimidazolidine, 2-(triethoxysilyl)-1,4-diethylpiperazine, 2-(dimethoxymethylsilyl)-1,4-dimethylpiperazine, 5-(triethoxysilyl)-1,3-dipropylhexahydropyrimidine, 5-(diethoxyethylsilyl)-1,3-diethylhexahydropyrimidine, 2-[3-(2-dimethylaminoethyl)-2-(ethyldimethoxysilyl)-imidazolidine-1-yl]-ethyl-dimethylamine, 5-(trimethoxysilyl)-1,3-bis(2-methoxyethyl)-hexahydropyrimidine, 5-(ethyldimethoxysilyl)-1,3-bis-(2-trimethylsilylethyl)-hexahydropyrimidinyl)-1,3-dimethylimidazolidine, 2-(3-diethoxyethylsilyl-propyl)-1,3-diethylimidazolidine, 2-(3-triethoxysilyl-propyl)-1,4-diethylpiperazine, 2-(3-dimethoxymethylsilyl-propyl)-1,4-dimethylpiperazine, 5-(3-triethoxysilyl-propyl)-1,3-dipropylhexahydropyrimidine, 5-(3-diethoxyethylsilyl-propyl)-1,3-diethylhexahydropyrimidine, 2-[3-(2-dimethylaminoethyl)-2-(ethyldimethoxysilyl-propyl)-imidazolidine-1-yl]ethyl-dimethylamine, 5-(3-trimethoxysilyl-propyl)-1,3-bis(2-methoxyethyl)-hexahydropyrimidine, 5-(3-ethyldimethoxysilyl-propyl)-1,3-bis-(2-trimethylsilylethyl)-hexahydropyrimidine, 3-dimethylaminopropyltrimethoxysilane, 3-diethylaminopropyltrimethoxysilane, 3-dimethylaminopropyltriethoxysilane, 3-diethylaminopropyltriethoxysilane, 3-ethylmethylaminopropyltrimethoxysilane, 3-ethylmethylaminopropyltriethoxysilane, 3-dimethylaminopropylmethyldimethoxysilane, 3-diethylaminopropylmethyldimethoxysilane, 3-dimethylaminopropylethyldimethoxysilane, 3-dimethylaminopropylethyldimethoxysilane, 3-diethylaminopropylethyldimethoxysilane, 3-dimethylaminopropyldimethylmethoxysilane, 3-dimethylaminopropyldiethylmethoxysilane, 3-diethylaminopropyldimethylmethoxysilane, 3-diethylaminopropyldiethylmethoxysilane, 3-ethylmethylaminopropylmethyldimethoxysilane, 3-methyl-3-ethylaminopropylethyldimethoxysilane, 3-dimethylaminopropylmethyldiethoxysilane, 3-diethylaminopropylmethyldiethoxysilane, 3-dimethylaminopropylethyldiethoxysilane, 3-diethylaminopropylethyldiethoxysilane, 3-dimethylaminopropyldimethylethoxysilane, 3-dimethylaminopropyldiethylethoxysilane, 3-diethylaminopropyldimethylethoxysilane, 3-diethylaminopropyldiethylethoxysilane, 3-ethylmethylaminopropylmethyldiethoxysilane, 3-ethylmethylaminopropylethyldiethoxysilane, 3-di(methoxymethyl)aminopropyltrimethoxysilane, 3-di(methoxyethyl)aminopropyltrimethoxysilane, 3-di(methoxymethyl)aminopropyltriethoxysilane, 3-di(methoxyethyl)aminopropyltriethoxysilane, 3-di(ethoxyethyl)aminopropyltrimethoxysilane, 3-di(ethoxymethyl)aminopropyltrimethoxysilane, 3-di(ethoxyethyl)aminopropyltriethoxysilane, 3-di(ethoxymethyl)aminopropyltriethoxysilane, 3-di(trimethylsilyl)aminopropyltrimethoxysilane, 3-di(trimethylsilyl)aminopropyltriethoxysilane, 3-di(t-butyldimethylsilyl)aminopropyltrimethoxysilane, 3-di(t-butyldimethylsilyl)aminopropyltriethoxysilane, 3-di(trimethylsilyl)aminopropylmethyldimethoxysilane, 3-di(trimethylsilyl)

aminopropylmethyldiethoxysilane, 3-di(t-butyldimethylsilyl)aminopropylmethyldimethoxysilane, 3-di(t-butyldimethylsilyl)aminopropylmethyldiethoxysilane, 3-di(trimethylsilyl)aminopropyldimethylmethoxysilane, 3-di(trimethylsilyl)aminopropyldimethylethoxysilane, 3-di(t-butyldimethylsilyl)aminopropyldimethylmethoxysilane, 3-di(t-butyldimethylsilyl)aminopropyldimethylethoxysilane, 3-morpholinopropyltrimethoxysilane, 3-morpholinopropyltriethoxysilane, 3-morpholinopropylmethyldimethoxysilane, 3-morpholinopropylethyldimethoxysilane, 3-morpholinopropylmethyldiethoxysilane, 3-morpholinopropylethyldiethoxysilane, 3-piperidinopropyltrimethoxysilane, 3-piperidinopropyltriethoxysilane, 3-piperidinopropylmethyldimethoxysilane, 3-piperidinopropylethyldimethoxysilane, 3-piperidinopropylmethyldiethoxysilane, 3-piperidinopropylethyldiethoxysilane, bis[3-(triethoxysilyl)propyl]trimethylsilylamine, bis[3-(trimethoxysilyl)propyl]trimethylsilylamine, 3-aminopropyltrimethoxysilane, 3-aminopropyltriethoxysilane, aminophenyltrimethoxysilane, aminophenyltriethoxysilane, 3-(N-methylamino)propyltrimethoxysilane, 3-(N-methylamino)propyltriethoxysilane, N-(2-aminoethyl)-3-aminopropyltrimethoxysilane, 2-(6-aminohexyl)aminopropyltrimethoxysilane, compounds having an ethanolamine structure or the like and an alkoxysilyl group, and the like.

Preferable examples thereof include N,N-bis(triethylsilyl)aminopropylmethyldimethoxysilane, N,N-bis(trimethylsilyl)aminopropylmethyldimethoxysilane, N,N-bis(trimethylsilyl)aminopropylmethyldiethoxysilane, N,N-bis(trimethylsilyl)aminopropyltriethoxysilane, 1-(3-triethoxysilylpropyl)-2,2,5,5-tetramethyl-1-aza-2,5-disilacyclopentane, N,N',N'-tris(trimethylsilyl)-N-(2-aminoethyl)-3-aminopropyltriethoxysilane, 1-trimethylsilyl-2,2-dimethoxy-1-aza-2-silacyclopentane, N-[3-(trimethoxysilyl)-propyl]-N,N'-diethyl-N'-trimethylsilyl-ethane-1,2-diamine, N-[3-(triethoxysilyl)-propyl]-N,N'-diethyl-N-trimethylsilyl-ethane-1,2-diamine, 3-(4-trimethylsilyl-1-piperazino)propyltriethoxysilane, N-[2-(trimethoxysilyl)-ethyl]-N,N',N'-trimethylethane-1,2-diamine, 1-[3-(triethoxysilyl)-propyl]-4-methylpiperazine, 2-(trimethylsilyl)-1,3-dimethylimidazolidine, 2-(3-trimethoxysilyl-propyl)-1,3-dimethylimidazolidine, 3-dimethylaminopropyltrimethoxysilane, 3-diethylaminopropyltrimethoxysilane, 3-dimethylaminopropyltriethoxysilane, 3-diethylaminopropyltriethoxysilane, bis[3-(triethoxysilyl)propyl]trimethylsilylamine, bis[3-(trimethoxysilyl)propyl]trimethylsilylamine, 3-aminopropyltrimethoxysilane, 3-aminopropyltriethoxysilane, N-(2-aminoethyl)-3-aminopropyltrimethoxysilane, and the like.

Examples of a compound having an imino group or a pyridyl group and a hydrocarbyloxy group include N-(1,3-dimethylbutylidene)-3-(triethoxysilyl)-1-propanamine, N-(1,3-methylethylidene)-3-(triethoxysilyl)-1-propanamine, N-ethylidene-3-(triethoxysilyl)-1-propanamine, N-(1-methylpropylidene)-3-(triethoxysilyl)-1-propanamine, N-(4-N,N-dimethylaminobenzylidene)-3-(triethoxysilyl)-1-propanamine, N-(cyclohexylidene)-3-(triethoxysilyl)-1-propanamine; trimethoxysilyl compounds, methyldiethoxysilyl compounds, and ethyldimethoxysilyl compounds corresponding to the triethoxysilyl compounds mentioned above; N-(3-trimethoxysilylpropyl)-4,5-dihydroimidazole, N-(3-trimethoxysilylpropyl)-4,5-dihydroimidazole, N-(3-trimethoxysilylpropyl)-4,5-imidazole, N-(3-triethoxysilylpropyl)-4,5-imidazole, 3-hexamethyleneiminopropyltrimethoxysilane, 3-hexamethyleneiminopropyltriethoxysilane, 3-hexamethyleneiminopropylmethyldimethoxysilane, 3-hexamethyleneiminopropylethyldimethoxysilane, 3-hexamethyleneiminopropylmethyldiethoxysilane, 3-hexamethyleneiminopropylethyldiethoxysilane, compounds each having a structure of benzimidazole, melamine, amidine or like and an alkoxysilyl group; and the like.

Preferable examples thereof include N-(1,3-dimethylbutylidene)-3-(triethoxysilyl)-1-propanamine, N-(1-methylpropylidene)-3-(triethoxysilyl)-1-propaneamide, N-(3-trimethoxysilylpropyl)-4,5-dihydroimidazole, N-(3-triethoxysilylpropyl)-4,5-dihydroimidazole, N-(3-trimethoxysilylpropyl)-4,5-imidazole, N-(3-triethoxysilylpropyl)-4,5-imidazole, and the like.

Examples of a compound having a primary phosphino group, a secondary phosphino group, a tertiary phosphino group, or a thiol group and a hydrocarbyloxy group include P,P-bis(trimethylsilyl)phosphinopropylmethyldimethoxysilane, P,P-bis(trimethylsilyl)phosphinopropyltrimethoxysilane, P,P-bis(trimethylsilyl)phosphinopropyltriethoxysilane, P,P-bis(trimethylsilyl)phosphinopropylmethyldiethoxysilane, P,P-bis(trimethylsilyl)phosphinoethyltrimethoxysilane, P,P-bis(trimethylsilyl)phosphinoethyltriethoxysilane, P,P-bis(trimethylsilyl)phosphinoethylmethyldimethoxysilane, P,P-bis(trimethylsilyl)phosphinoethylmethyldiethoxysilane, 3-dimethylphosphinopropyltrimethoxysilane, 3-diethylphosphinopropyltrimethoxysilane, 3-dimethylphosphinopropyltriethoxysilane, 3-diethylphosphinopropyltriethoxysilane, 3-ethylmethylphosphinopropyltrimethoxysilane, 3-ethylmethylphosphinopropyltriethoxysilane, 3-dimethylphosphinopropylmethyldimethoxysilane, 3-diethylphosphinopropylmethyldimethoxysilane, 3-dimethylphosphinopropylethyldimethoxysilane, 3-diethylphosphinopropylethyldimethoxysilane, 3-dimethylphosphinopropyldimethylmethoxysilane, 3-dimethylphosphinopropyldiethylmethoxysilane, 3-diethylphosphinopropyldimethylmethoxysilane, 3-diethylphosphinopropyldiethylmethoxysilane, 3-ethylmethylphosphinopropylmethyldimethoxysilane, 3-ethylmethylphosphinopropylethyldimethoxysilane, 3-dimethylphosphinopropylmethyldiethoxysilane, 3-diethylphosphinopropylmethyldiethoxysilane, 3-dimethylphosphinopropylethyldiethoxysilane, 3-diethylphosphinopropylethyldiethoxysilane, 3-dimethylphosphinopropyldimethylethoxysilane, 3-dimethylphosphinopropyldiethylethoxysilane, 3-diethylphosphinopropyldimethylethoxysilane, 3-diethylphosphinopropyldiethylethoxysilane, 3-ethylmethylphosphinopropylmethyldiethoxysilane, 3-ethylmethylphosphinopropylethyldiethoxysilane, 3-diphenylphosphinopropyltrimethoxysilane, 3-diphenylphosphinopropyltriethoxysilane, 3-diphenylphosphinopropylmeryldimethoxysilane, 3-diphenylphosphinopropylmeryldiethoxysilane, S-trimethylsilylmercaptopropylmethyldimethoxysilane, S-trimethylsilylmercaptopropyltrimethoxysilane, S-trimethylsilylmercaptopropyltriethoxysilane, S-trimethylsilylmercaptopropylmethyldiethoxysilane, S-trimethylsilylmercaptoethyltrimethoxysilane, S-trimethylsilylmercaptoethyltriethoxysilane, S-trimethylsilylmercaptoethylmethyldimethoxysilane, S-trimethylsilylmercaptoethylmethyldiethoxysilane, 3-mercaptomethyltrimethoxysilane, 3-mercaptomethyltriethoxysilane, 3-mercaptopropyltriethoxysilane, 3-mercaptopropyltrimethoxysilane, mercaptosilane compounds exemplified in JP-A-2006-249069, and the like.

Preferable examples thereof include 3-diphenylphosphinopropyltrimethoxysilane, 3-diphenylphosphinopropyltriethoxysilane, S-trimethylsilylmercaptopropylmethyldimethoxysilane, S-trimethylsilylmercaptopropyltrimethoxysilane, S-trimethylsilylmercaptopropyltriethoxysilane, S-trimethylsilylmercaptopropylmethyldiethoxysilane, and the like.

Mixing of such a second hydrocarbyloxysilane compound and the modified conjugated diene polymer produced in the preceding step can be carried out, e.g., in the form of a solution. The mixing has no particular limitation as to its form, and it may be carried out by using a batch-type mixer or it may be carried out in a continuous mode by using an instrument such as a multistage continuous mixer or an in-line mixer. In addition, it is preferable that the reaction by this mixing be performed in advance of various operations required for solvent removal treatment, water treatment, heat treatment, and isolation of the polymer after completion of polymerization reaction.

The amount of the second hydrocarbyloxysilane compound to be used in the mixing is preferably 0.2 molar equivalents or more and more preferably 0.3 molar equivalents or more relative to the hydrocarbyloxy group present in the reaction system. When the amount is 0.2 molar equivalents or more, capture of the second hydrocarbyloxysilane compound with conversion into an onium is enough, and the ability to disperse a reinforcing agent is sufficiently improved. Also, when a crosslinked rubber is formed, the rubber is excellent in tensile strength, abrasion resistance, wet skid resistance, and low hysteresis-loss property.

Moreover, it is also possible to use the same one both as the first hydrocarbyloxysilane compound and the second hydrocarbyloxysilane compound.

In this connection, the method for adding the second hydrocarbyloxysilane compound as a modifier has no particular limitation, and examples thereof include a method of addition by one operation, a method of addition dividedly, and a method of continuous addition. Of these methods, the method of addition by one operation is preferred. Moreover, the second hydrocarbyloxysilane compound may be added in the form of a solution containing such a hydrocarbon solvent as described in the present description, such a randomizer as described in the present description, or so on as a solvent.

As a temperature at which the second hydrocarbyloxysilane compound is mixed with the modified conjugated diene polymer obtained in the preceding step, the polymerization temperature of the conjugated diene polymer can be utilized just as it is. The temperature is preferably from 0 to 120° C. and more preferably from 20 to 100° C. Decrease in the temperature tends to cause an increase in polymer viscosity, whereas increase in the temperature tends to cause deterioration of the polymerization active end. Therefore, a temperature falling outside the numerical range specified above is unpreferable. In addition, the mixing time is preferably from 1 minute to 5 hours and more preferably from 2 minutes to 1 hour.

By performing at least one step selected from the steps (B) to (D) after the step (A), more satisfactory modified conjugated diene rubber can be obtained.

The steps (B) to (D) can be performed in any order and in any combination.

Moreover, a step of bringing water into contact may be further added after these steps. By bringing water into contact with the onium-forming agent, an onium structure is formed and a modified conjugated diene rubber having the onium structure can be obtained.

Specifically, by bringing water into contact with the onium-forming agent, (a) the modified conjugated diene rubber obtained in the step (A) or the modified conjugated diene rubber and at least one selected from the group consisting of (b) the second hydrocarbyloxysilane compound, (c) a hydrolytic condensate of the modified conjugated diene rubber with the second hydrocarbyloxysilane compound, (d) a hydrolytic condensate of the modified conjugated diene rubber with the condensation catalyst, (e) a hydrolytic condensate of the second hydrocarbyloxysilane compound with the condensation catalyst, and (f) a hydrolytic condensate of the modified conjugated diene rubber and the second hydrocarbyloxysilane compound with the condensation catalyst form an onium structure, and a modified conjugated diene rubber having the onium structure can be obtained.

The method for forming an onium structure by bringing water into contact with the onium-forming agent has no particular limitation, and preferable examples thereof include (i) a method of adding water directly to the polymer solution after the step and mixing them, (ii) a method of adding a solution prepared by dissolving water in an organic solvent soluble in both water and an organic solvent such as alcohol to the polymer solution after the step and mixing them, and (iii) a method of mixing the polymer solution and/or the polymer and water simultaneously with solvent removal in the steam stripping process after the step. Of these methods, (iii) a method of mixing the polymer solution and/or the polymer and water simultaneously with solvent removal in the steam stripping process after the step is especially preferred in terms of effective formation of the onium structure.

Moreover, a temperature at the reaction time is preferably from 30 to 150° C. and more preferable from 80 to 120° C.

The modified conjugated diene rubber to be used in the step may be used in the state of a polymer solution which is made at the time of preparation of the modified conjugated diene rubber and does not undergo removal of the solvent yet, or it may be used after solvent removal from the polymer solution by steam stripping or the like and subsequent drying followed by dissolution of the resulting modified conjugated diene rubber again in a solvent such as cyclohexane.

[2] Modified Conjugated Diene Rubber:

The modified conjugated diene rubber of the present invention is a modified conjugated diene rubber produced by the hitherto described method for producing a modified conjugated diene rubber of the present invention. Such a modified conjugated diene rubber has high Mooney viscosity; and is superior in shape stability and excellent in workability. Mooney viscosity (ML1+4, 100° C.) of the modified conjugated diene rubber of the present invention is preferably from 30 to 150 and more preferably from 40 to 120. When Mooney viscosity is lower than 30, the shape stability tends to decrease. When Mooney viscosity exceeds 150, the workability thereof deteriorates, and sometimes it becomes difficult to knead the rubber with a compounding agent. In this connection, when Mooney viscosity is too high, the rubber is generally oil-extended with extension oil so as to have Mooney viscosity in the range. As the extension oil, aromatic oil, naphthene oil, paraffin oil, or an aromatic-oil substitute with a PCA content of 3 mass % or lower as measured by Method IP 346 is preferably used. Although the extension oil may be used in an arbitrary amount, it is usually used in an amount of 10 to 50 parts by mass relative to 100 parts by mass of the modified conjugated diene rubber. When extension oil is used, the mixing amount is generally from 20 to 37.5 parts by mass in most cases. In the classification by manufacturing process of the oil, T-DAE (Treated Distillate Aromatic Extract) oil, T-RAE (Treated Residual Aromatic Extract) oil, MES (Mild Extract Solvate) oil, RAE (Residual Aromatic Extract) oil, and the like can be used suitably.

[3] Rubber Composition:

The rubber composition of the present invention contains as a rubber ingredient the modified conjugated diene rubber as mentioned above. Details thereof are described below.

[3-1] Rubber Ingredients:

The rubber ingredient in the rubber composition of the present invention contains the modified conjugated diene rubber as mentioned above. The content of the modified conjugated diene rubber in the rubber ingredient is preferably 20 mass % or higher, more preferably 30 mass % or higher, and particularly preferably 40 mass % or higher. By adjusting the content to be 20 mass % or higher, mechanical properties, such as tensile strength and tensile elongation, crack-growth resistance, and abrasion resistance of the crosslinked rubber can be made more satisfactory.

Moreover, the modified conjugated diene rubber may contain one kind of the modified conjugated diene rubber, or it may contain two or more kinds of the modified conjugated diene rubbers. Besides the modified conjugated diene rubber(s), the modified conjugated diene rubber may contain other rubber ingredients. Examples of the other rubber ingredients include natural rubber, synthetic isoprene rubber, butadiene rubber, modified butadiene rubber, styrene-butadiene rubber, modified styrene-butadiene rubber, ethylene-α-olefin copolymer rubber, ethylene-α-olefin-diene copolymer rubber, acrylonitrile-butadiene copolymer rubber, chloroprene rubber, halogenated butyl rubber, styrene-isoprene copolymer rubber, butadiene-isoprene copolymer rubber, random styrene-butadiene-isoprene copolymer rubber, styrene-acrylonitrile-butadiene copolymer rubber, acrylonitrile-butadiene copolymer rubber and polystyrene-polybutadiene-polystyrene block copolymer, and mixtures thereof. Even when other rubber ingredients known to be usable as rubber compositions for tires are incorporated, it is possible to produce a crosslinked rubber superior in low hysteresis-loss property.

[3-2] Other Ingredients (Carbon Black, Silica):

It is preferable that the rubber composition of the present invention further contains carbon black and/or silica. Examples of carbon black include furnace black, typified by SRF, GPF, FEF, HAF, ISAF, SAF, ISAF-HS, ISAF-LS, IISAF-HS, HAF-HS and HAF-LS, acetylene black, thermal black, channel black, graphite, graphite fibers, and fullerenes. Additionally, carbon black having an iodine adsorption (IA) of 60 mg/g or more and a dibutyl phthalate oil absorption (DBP) of 80 ml/100 g or more is preferred. The use of carbon black increases effects on improvements in grip performance and fracture resistance characteristics of the crosslinked rubber. In this connection, HAF, ISAF and SAF excellent in abrasion resistance are particularly preferred. One type of carbon black may be used alone, or two or more types thereof may be used in combination.

Examples of silica include wet silica (hydrated silicic acid), dry silica (silicic acid anhydride), colloidal silica, precipitated silica, calcium silicate, aluminum silicate, and the like. Of these, wet silica is preferred because of its most remarkable effects on improvements in fracture resistance characteristics and compatibility between wet grip and a low hysteresis-loss property. Moreover, it is also preferable to use silica of high dispersible type from the viewpoints of physical properties and workability because the use of such silica ensures satisfactory dispersion into rubber. One type of silica may be used alone, or two or more types thereof may be used in combination.

The amount of carbon black and/or silica in the rubber composition of the present invention is preferably from 20 to 130 parts by mass relative to 100 parts by mass of rubber ingredients (the sum of the modified conjugated diene rubber and other rubber ingredients), and more preferably from 25 to 110 parts by mass from the viewpoint of reinforcement and its accompanying effect on improvements in various physical properties. In this connection, when the content of carbon black and/or silica is low, there is a tendency that the effect on improvements in fracture resistance characteristics and so on is insufficient. When the content of carbon black and/or silica is high, there is a tendency that workability of rubber compositions decreases. Therefore, it is preferable that the content falls within the above numerical range. Moreover, by compounding a carbon-silica dual phase filler into the rubber composition of the present invention, an excellent advantage similar to the advantage brought by the combined use of carbon black and silica can be obtained. The carbon-silica dual phase filler is so-called silica coating carbon black, which is carbon black to the surface of which silica is chemically bonded. It is commercially available as products of Cabot Corporation marketed under the trade names of CRX2000, CRX2002, and CRX2006. The amount of the carbon-silica dual phase filler to be compounded is preferably from 1 to 100 parts by mass and more preferably from 5 to 95 parts by mass relative to 100 parts by mass of the sum of the rubber ingredients.

In the case of incorporating silica as a reinforcing agent into the rubber composition of the present invention, it is preferable to compound a silane coupling agent into silica for further improvement in reinforcing effect. Examples of the silane coupling agent include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropylbenzothiazolyl tetrasulfide, 3-triethoxysilylpropylbenzolyl tetrasulfide, 3-triethoxysilylpropylmethacrylate monosulfide, 3-trimethoxysilylpropylmethacrylate monosulfide, bis(3-diethoxymethylsilylpropyl) tetrasulfide, 3-mercaptopropyldimethoxymethylsilane, dimethoxymethylsilylpropyl-N,N-dimethylthiocarbamoyl tetrasulfide, dimethoxymethylsilylpropylbenzothiazolyl tetrasulfide, vinyltriethoxysilane, β-(3,4-epoxycyclohexyl)ethyltrimethoxysilane, N-(β-aminoethyl)-γ-aminopropyltrimethoxysilane, 3-octathio-1-propyl-triethoxysilane, γ-trimethoxysilylpropyldimethylthiocarbamyl tetrasulfide, γ-trimethoxysilylpropylbenzothiazyl tetrasulfide, and the mercaptosilane compounds recited in JP-A-2006-249069. Examples of a commercially available one include trade names "NXT Silane", "NXT-Low-V Silane" and "NXT Ultra Low-V Silane" manufactured by Momentive Performance Materials Inc., trade name "VP Si363" manufactured by Degussa AG, trade name "11-MERCAPTOUNDECYLTRIMETHOXYSILANE" (manufactured by Gelest Inc.), and the like. Of these, bis(3-triethoxysilylpropyl)polysulfide, 3-trimethoxysilylpropylbenzothiazyl tetrasulfide, and the mercaptosilane compounds recited in JP-A-2006-249069 are suitable in point of their effects on improvement in reinforcing ability and the like. In this connection, these coupling agents can be used alone, or two or more of them can be used in combination. Although the amount of the silane coupling agent to be compounded varies depending on the type and the like thereof, the amount is preferably from 1 to 20 parts by mass and more preferably from 3 to 15 parts by mass relative to 100 parts by mass of silica. When the amount is less than one part by mass, there is a tendency that effects as a silane coupling agent become difficult to sufficiently produce. On the other hand, when the amount is more than 20 parts by mass, there is a tendency that the rubber ingredients are prone to be gelated.

Various compounding agents for the rubber composition of the present invention have no particular limitation. For example, it is also possible to add a compatibility-imparting agent at the time of kneading for the purpose of improving the workability under kneading or further enhancing a balance among wet skid resistance, a low hysteresis-loss property, and abrasion resistance. Preferable examples of the compatibility-imparting agent include an organic compound selected from among epoxy group-containing compounds, carboxylic acid compounds, carboxylate ester compounds, ketone compounds, ether compounds, aldehyde compounds, hydroxyl group-containing compounds, and amino group-containing compounds, and a silicone compound selected from among hydrocarbyloxysilane compounds, siloxane compounds, and aminosilane compounds.

Examples of the organic compound as a compatibility-imparting agent include epoxy group-containing compounds, carboxylic acid compounds, carboxylate ester compounds, ketone compounds, ether compounds, aldehyde compounds, amino group-containing compounds, and hydroxyl group-containing compounds, and the like.

Examples of these various organic compounds include the following compounds.

Epoxy group-containing compounds include butyl glycidyl ether, diglycidyl ether, propylene oxide, neopentyl glycol diglycidyl ether, epoxy resins, epoxidized soybean oil, epoxidized fatty acid esters, and the like.

Carboxylic acid compounds include adipic acid, octylic acid, methacrylic acid, and the like.

Carboxylate ester compounds include acrylate esters, diethylene acrylate, ethyl methacrylate, orthoacetic acid esters, ethyl acetoacetate, butyl acetate, isopropyl acetate, dimethyl carbonate, p-hydroxyphenyl acetate, polyester-type plasticizers, stearic acid-type plasticizers, and the like.

Ketone compounds include methylcyclohexanone, acetylacetone, and the like.

Ether compounds include isopropyl ether, dibutyl ether, and the like.

Aldehyde compounds include undecylene aldehyde, decyl aldehyde, vanillin, 3,4-dimethoxybenzaldehyde, cuminaldehyde, and the like.

Amino group-containing compounds include isopropylamine, diisopropylamine, triethylamine, 3-ethoxypropylamine, 2-ethylhexylamine, isopropanolamine, N-ethylethylenediamine, ethyleneimine, hexamethylenediamine, 3-lauryloxypropylamine, aminophenol, aniline, 3-isopropoxyaniline, phenylenediamine, aminopyridine, N-methyldiethanolamine, N-methylethanolamine, 3-amino-1-propanol, ethylamine hydrochloride, n-butylamine hydrochloride, and the like.

Hydroxyl group-containing compounds include isopropyl alcohol, butanol, octanol, octanediol, ethylene glycol, methylcyclohexanol, 2-mercaptoethanol, 3-methyl-3-methoxy-1-butanol, 3-methyl-1,5-pentanediol, 1-octadecanol, diethylene glycol, butylene glycol, dibutylene glycol, triethylene glycol, and the like.

Of these compounds, epoxy group-containing compounds, amino group-containing compounds, and hydroxyl group-containing compounds are preferable.

Examples of the silicone compound as a compatibility-imparting agent include hydrocarbyloxysilane compounds, siloxane compounds, aminosilane compounds, and the like.

Examples of these silicone compound include the following compounds.

Hydrocarbyloxysilane compounds include trimethylmethoxysilane, trimethylethoxysilane, dimethyldimethoxysilane, methyltriethoxysilane, methyltriphenoxysilane, tetraethoxysilane, methyldiethoxysilane, vinyltrimethoxysilane, and the like.

Siloxane compounds include dimethylsiloxane oligomer, silicone oil, amino-modified silicone oil, epoxy-modified silicone oil, carboxyl-modified silicone oil, polyether-modified silicone oil, alkyl-modified silicone oil, higher fatty acid ester-modified silicone oil, higher alkoxy-modified silicone oil, higher fatty acid-containing silicone oil, and the like.

Aminosilane compounds include hexamethyldisilazane, nonamethyltrisilazane, anilitrimethylsilane, bis(dimethylamino)dimethylsilane, bis(diethylamino)dimethylsilane, triethylaminosilane, and the like.

Of these compounds, the silazane compounds and bis(dimethylamino)dimethylsilane are preferable.

To the rubber composition of the present invention, various kinds of chemicals and additives commonly used in rubber industry can be added, if desired, to the extent where the aims of the present invention are not impaired. Examples of various kinds of chemicals and additives which can be compounded to the rubber composition of the present invention include a crosslinking agent, a vulcanization aid, a processing aid, a vulcanization accelerator, a process oil, an ageing inhibitor, a scorch inhibitor, zinc oxide (zinc white), stearic acid, and the like.

Examples of the crosslinking agent include sulfur, organic oxide crosslinking agents, quinoid crosslinking agents, resin crosslinking agents, and the like. More specifically, examples thereof include vulcanizing agents (sulfur, sulfur halides), organic peroxides, quinone dioximes, organic polyamine compounds, and alkylphenol resins containing a methylol group. Of these, sulfur is usually used. The amount of the crosslinking agent to be used is preferably from 0.1 to 5 parts by mass and preferably from 0.5 to 3 parts by mass relative to 100 parts by mass of the rubber ingredient.

As the vulcanization aid and the processing aid, stearic acid is generally used. The amount of the vulcanization aid and the processing aid to be used is usually from 0.5 to 5 parts by mass relative to 100 parts by mass of the rubber ingredient.

Examples of the vulcanization accelerator have no particular limitation and include compounds of sulfenamide type, guanidine type, thiuram type, thiourea type, thiazole type, dithiocarbamic acid type, or xanthogenic acid type. Preferable examples thereof include 2-mercaptobenzothiazole, dibenzothiazyl disulfide, N-cyclohexyl-2-benzothiazylsulfenamide, N-t-butyl-2-benzothiazolesulfenamide, N-oxyethylene-2-benzothiazolesulfenamide, N-oxyethylene-2-benzothiazolesulfenamide, N,N'-diisopropyl-2-benzothiazolesulfenamide, diphenylguanidine, diorthotolylguanidine, orthotolylbisguanidine, and the like. The amount of the vulcanization accelerator to be used is usually from 0.1 to 5 parts by mass and preferably from 0.4 to 4 parts by weight relative to 100 parts by mass of the rubber ingredient.

The rubber composition of the present invention can be prepared through kneading with a kneader, such as an open kneader including a roll-type one or such as a closed kneader including Banbury mixer. Additionally, the rubber composition can be applied to various rubber products by crosslinking (vulcanization) subsequent to molding. The crosslinked rubber (rubber composition after crosslinking) of the present invention is suitable in applications such as tires (e.g., components including tire tread, under tread, a carcass, a side wall, a bead component, and the like), a rubber cushion, a fender, a belt, a hose, other industrial products, and so on. The crosslinked rubber of the present invention is especially suitably used as a rubber for tire tread.

In the present invention, physical properties and so on of each of the conjugated diene polymer, the modified conjugated diene rubber, the rubber composition, and the crosslinked rubber are as follows.

From the viewpoint of maintaining a balance between shape stability of the modified conjugated diene rubber and workability in preparing the rubber composition, the weight-average molecular weight of the conjugated diene polymer before modification is preferably from 10,000 to 1,500,000, more preferably from 50,000 to 1,000,000, and especially preferably from 100,000 to 800,000, as measured by gel permeation chromatography (GPC) and calculated in terms of polystyrene.

The glass transition temperature of the modified conjugated diene rubber is preferably 0° C. or below, more preferably −5° C. or below, and especially preferably −10° C. or below, from the viewpoint of maintaining a balance between a low hysteresis-loss property and wet skid resistance of the crosslinked rubber to be obtained.

The Mooney viscosity (ML 1+4, 100° C.) of the modified conjugated diene rubber is preferably from 30 to 150 and more preferably from 40 to 120, from the viewpoint of maintaining a balance between shape stability of the modified conjugated diene rubber and workability in preparing the rubber composition.

The cold flow value (mg/minute) of the modified conjugated diene rubber is preferably 1.5 or below, more preferably 1.0 or below, and especially preferably 0.5 or below, from the viewpoint of shape stability of the modified conjugated diene rubber.

The Mooney viscosity (ML 1+4, 100° C.) of the rubber composition is preferably from 20 to 150, more preferably from 30 to 130, and especially preferably from 40 to 110, from the viewpoint of workability in making tires.

EXAMPLES

Although the present invention is explained specifically on the basis of Examples, the present invention should not be construed as being limited to these Examples. In this connection, "parts" and "%" in the following Examples and Comparative Examples are on a mass basis unless otherwise indicated. Also, methods for measuring the values of various physical properties are indicated below.

[Amount of styrene unit (%)]: The value was determined by 500 MHz $^1$H-NMR.

[Vinyl content (%)]: The value was determined by 500 MHz $^1$H-NMR.

[Glass transition temperature (° C.)]: The value was measured in accordance with ASTM D3418.

[Weight-average molecular weight before modification]: The value was determined from a retention time corresponding to the top of a maximum peak on a GPC curve prepared through the use of gel permeation chromatography (GPC) (HLC-8120GPC, trade name, manufactured by Tosoh Corporation) and calculated in terms of polystyrene.

(Conditions of GPC)

Column: Two of columns under the trade name of "GMH-HXL" (manufactured by Tosoh Corporation)

Column temperature: 40° C.

Mobile phase: Tetrahydrofuran

Flow velocity: 1.0 ml/min

Sample concentration: 10 mg/20 ml

[Mooney viscosity (ML1+4, 100° C.)]: The value was determined in accordance with JIS K6300 and by using an L-rotor under conditions that preheating was carried out for 1 minute and the rotor was operated for 4 minutes at a temperature of 100° C.

Example 1

Synthesis of Modified Conjugated Diene Rubber a, and Evaluation Thereof

Into an autoclave reactor having an inner volume of 5 L, which had been subjected to nitrogen substitution, 2,750 g of cyclohexane, 50.0 g of tetrahydrofuran, 125 g of styrene, and 365 g of 1,3-butadiene were charged. After the temperature of the contents in the reactor was adjusted to 10° C., polymerization was initiated by adding a cyclohexane solution containing n-butyllithium (5.80 mmol). The polymerization was carried out under adiabatic conditions, and the maximum temperature reached 85° C.

When the polymerization conversion rate reached 99%, 10 g of butadiene was further added, and polymerization was further performed for 5 minutes. Thereafter, 10 g of the polymer solution was sampled for measurement of molecular weight before modification, and a cyclohexane solution containing a hydrocarbyloxysilane compound (4.96 mmol) of the following chemical formula (1) was added and reaction was performed for 15 minutes.

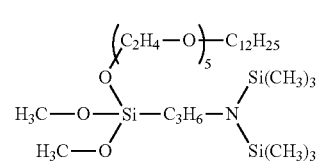

(1)

Then, to the thus obtained polymer solution, 2.0 g of 2,6-di-tert-butyl-p-cresol was added. Subsequently, the solvent was removed by performing steam stripping through the use of hot water adjusted to pH=9 with sodium hydroxide, and the resulting rubber was dried with hot rolls adjusted to a temperature of 110° C. Thus, a modified conjugated diene rubber A was obtained.

The polymerization recipe of the modified conjugated diene rubber A is shown in Table 1, and properties of the modified conjugated diene rubber A thus obtained are shown in Table 2. In addition, a rubber composition was prepared using the modified conjugated diene rubber A and following a compounding recipe shown in Table 3 and was then vulcanized. Thereafter, evaluations of physical properties were performed. Results thereof are shown in Table 4.

Example 2

Synthesis of Modified Conjugated Diene Rubber B, and Evaluation Thereof

A modified conjugated diene rubber B was produced in the same manner as in Example 1, except that a hydrocarbyloxysilane compound of the following chemical formula (2) was used in place of the hydrocarbyloxysilane compound of the above chemical formula (1) in Example 1.

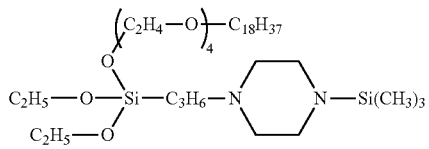

(2)

The polymerization recipe of the modified conjugated diene rubber B is shown in Table 1, and properties of the modified conjugated diene rubber B thus obtained are shown in Table 2. In addition, a rubber composition was prepared using the modified conjugated diene rubber B and following a compounding recipe shown in Table 3 and was then vulcanized. Thereafter, evaluations of physical properties were performed. Results thereof are shown in Table 4.

Example 3

Synthesis of Modified Conjugated Diene Rubber C, and Evaluation Thereof

Into an autoclave reactor having an inner volume of 5 L, which had been subjected to nitrogen substitution, 2,750 g of cyclohexane, 10.3 g of tetrahydrofuran, 50 g of styrene, and 440 g of 1,3-butadiene were charged. After the temperature of the contents in the reactor was adjusted to 10° C., polymerization was initiated by adding a cyclohexane solution containing n-butyllithium (5.80 mmol). The polymerization was carried out under adiabatic conditions, and the maximum temperature reached 85° C.

When the polymerization conversion rate reached 99%, 10 g of butadiene was added, and polymerization was further performed for 5 minutes. Thereafter, 10 g of the polymer solution was sampled for measurement of molecular weight before modification, and a cyclohexane solution containing a hydrocarbyloxysilane compound (4.96 mmol) of the following chemical formula (3) was added, followed by reaction for 15 minutes.

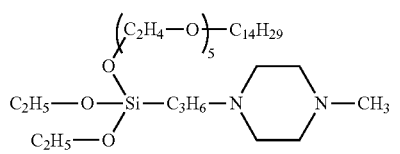

(3)

Then, to the thus obtained polymer solution, 2.0 g of 2,6-di-tert-butyl-p-cresol was added. Subsequently, the solvent was removed by performing steam stripping through the use of hot water adjusted to pH=6 with sodium hydroxide, and the resulting rubber was dried with hot rolls adjusted to a temperature of 110° C. Thus, a modified conjugated diene rubber C was obtained.

The polymerization recipe of the modified conjugated diene rubber C is shown in Table 1, and properties of the modified conjugated diene rubber C thus obtained are shown in Table 2. In addition, a rubber composition was prepared using the modified conjugated diene rubber C and following a compounding recipe shown in Table 3 and was then vulcanized. Thereafter, evaluations of physical properties were performed. Results thereof are shown in Table 4.

Example 4

Synthesis of Modified Conjugated Diene Rubber D, and Evaluation Thereof

A modified conjugated diene rubber D was produced in the same manner as in Example 1, except that a hydrocarbyloxysilane compound of the following chemical formula (4) was used in place of the hydrocarbyloxysilane compound of the above chemical formula (1) in Example 1.

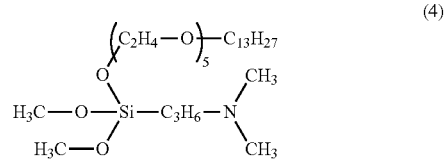

(4)

The polymerization recipe of the modified conjugated diene rubber D is shown in Table 1, and properties of the modified conjugated diene rubber D thus obtained are shown in Table 2. In addition, a rubber composition was prepared using the modified conjugated diene rubber D and following a compounding recipe shown in Table 3 and was then vulcanized. Thereafter, evaluations of physical properties were performed. Results thereof are shown in Table 4.

Example 5

Synthesis of Modified Conjugated Diene Rubber E, and Evaluation Thereof

A modified conjugated diene rubber E was obtained in the same manner as in Example 1, except that a hydrocarbyloxysilane compound of the following chemical formula (5) was used in place of the hydrocarbyloxysilane compound of the following chemical formula (1) in Example 1.

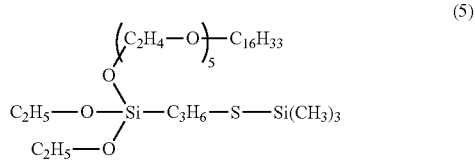

(5)

The polymerization recipe of the modified conjugated diene rubber E is shown in Table 1, and properties of the modified conjugated diene rubber E thus obtained are shown in Table 2. In addition, a rubber composition was prepared using the modified conjugated diene rubber E and following a compounding recipe shown in Table 3 and was then vulcanized. Thereafter, evaluations of physical properties were performed. Results thereof are shown in Table 4.

Example 6

Synthesis of Modified Conjugated Diene Rubber F, and Evaluation Thereof

A modified conjugated diene rubber F was obtained in the same manner as in Example 1, except that a hydrocarbyloxysilane compound of the following chemical formula (6) was used in place of the hydrocarbyloxysilane compound of the above chemical formula (1) in Example 1.

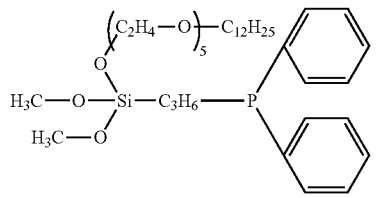

The polymerization recipe of the modified conjugated diene rubber F is shown in Table 1, and properties of the modified conjugated diene rubber F thus obtained are shown in Table 2. In addition, a rubber composition was prepared using the modified conjugated diene rubber F and following a compounding recipe shown in Table 3 and was then vulcanized. Thereafter, evaluations of physical properties were performed. Results thereof are shown in Table 4.

Example 7

Synthesis of Modified Conjugated Diene Rubber G, and Evaluation Thereof

Into an autoclave reactor having an inner volume of 5 L, which had been subjected to nitrogen substitution, 2,750 g of cyclohexane, 50.0 g of tetrahydrofuran, 125 g of styrene, and 365 g of 1,3-butadiene were charged. After the temperature of the contents in the reactor was adjusted to 10° C., polymerization was initiated by adding a cyclohexane solution containing n-butyllithium (5.80 mmol). The polymerization was carried out under adiabatic conditions, and the maximum temperature reached 85° C.

When the polymerization conversion rate reached 99%, 10 g of butadiene was further added, and polymerization was further performed for 5 minutes. Thereafter, 10 g of the polymer solution was sampled for measurement of molecular weight before modification, and a cyclohexane solution containing a hydrocarbyloxysilane compound (4.96 mmol) of the above chemical formula (1) was added and reaction was performed for 15 minutes. To the polymer solution after the reaction, a cyclohexane solution containing 3-aminopropyl-triethoxysilane (4.96 mmol) was added, and the whole was mixed for 5 minutes. Furthermore, a cyclohexane solution containing bis(2-ethylhexanoato)tin (4.96 mmol) was added, followed by 5-minute mixing. Then, to the thus obtained polymer solution, 2.0 g of 2,6-di-tert-butyl-p-cresol was added. Subsequently, the solvent was removed by performing steam stripping through the use of hot water adjusted to pH=9 with sodium hydroxide, and the resulting rubber was dried with hot rolls adjusted to a temperature of 110° C. Thus, a modified conjugated diene rubber G was obtained.

The polymerization recipe of the modified conjugated diene rubber G is shown in Table 1, and properties of the modified conjugated diene rubber G thus obtained are shown in Table 2. In addition, a rubber composition was prepared using the modified conjugated diene rubber G and following a compounding recipe shown in Table 3 and was then vulcanized. Thereafter, evaluations of physical properties were performed. Results thereof are shown in Table 4.

Example 8

Synthesis of Modified Conjugated Diene Rubber H, and Evaluation Thereof

Into an autoclave reactor having an inner volume of 5 L, which had been subjected to nitrogen substitution, 2,750 g of cyclohexane, 50.0 g of tetrahydrofuran, 125 g of styrene, and 365 g of 1,3-butadiene were charged. After the temperature of the contents in the reactor was adjusted to 10° C., polymerization was initiated by adding a cyclohexane solution containing n-butyllithium (5.80 mmol). The polymerization was carried out under adiabatic conditions, and the maximum temperature reached 85° C.

When the polymerization conversion rate reached 99%, 10 g of butadiene was further added, and polymerization was further performed for 5 minutes. Thereafter, 10 g of the polymer solution was sampled for measurement of molecular weight before modification, and a cyclohexane solution containing a hydrocarbyloxysilane compound (4.96 mmol) of the above chemical formula (1) was added and reaction was performed for 15 minutes. To the polymer solution after the reaction, a cyclohexane solution containing bis(2-ethylhexanoato)zirconium oxide (4.96 mmol) was added, followed by 5-minute mixing. Then, to the thus obtained polymer solution, 2.0 g of 2,6-di-tert-butyl-p-cresol was added. Subsequently, the solvent was removed by performing steam stripping through the use of hot water adjusted to pH=9 with sodium hydroxide, and the resulting rubber was dried with hot rolls adjusted to a temperature of 110° C. Thus, a modified conjugated diene rubber H was obtained.

The polymerization recipe of the modified conjugated diene rubber H is shown in Table 1, and properties of the modified conjugated diene rubber H thus obtained are shown in Table 2. In addition, a rubber composition was prepared using the modified conjugated diene rubber H and following a compounding recipe shown in Table 3 and was then vulcanized. Thereafter, evaluations of physical properties were performed. Results thereof are shown in Table 4.

Example 9

Synthesis of Modified Conjugated Diene Rubber I, and Evaluation Thereof

A modified conjugated diene rubber I was obtained in the same manner as in Example 7, except that bis(2-ethylhexanoato)tin was not added in Example 7.

The polymerization recipe of the modified conjugated diene rubber I is shown in Table 1, and properties of the modified conjugated diene rubber I thus obtained are shown in Table 2. In addition, a rubber composition was prepared using the modified conjugated diene rubber I and following a compounding recipe shown in Table 3 and was then vulcanized. Thereafter, evaluations of physical properties were performed. Results thereof are shown in Table 4.

Example 10

Synthesis of Modified Conjugated Diene Rubber J, and Evaluation Thereof

A modified conjugated diene rubber J was obtained in the same manner as in Example 9, except that N-2-(aminoethyl)-

3-aminopropyltrimethoxysilane was used in place of 3-aminopropyltriethoxysilane in Example 9.

The polymerization recipe of the modified conjugated diene rubber J is shown in Table 1, and properties of the modified conjugated diene rubber J thus obtained are shown in Table 2. In addition, a rubber composition was prepared using the modified conjugated diene rubber J and following a compounding recipe shown in Table 3 and was then vulcanized. Thereafter, evaluations of physical properties were performed. Results thereof are shown in Table 4.

Example 11

Synthesis of Modified Conjugated Diene Rubber K, and Evaluation Thereof

Into an autoclave reactor having an inner volume of 5 L, which had been subjected to nitrogen substitution, 2,750 g of cyclohexane, 3.25 mmol of 2,2-di(tetrahydrofuryl)propane, 125 g of styrene, 4.70 mmol of piperidine, and 365 g of 1,3-butadiene were charged. After the temperature of the contents in the reactor was adjusted to 10° C., polymerization was initiated by adding a cyclohexane solution containing n-butyllithium (5.80 mmol). The polymerization was carried out under adiabatic conditions, and the maximum temperature reached 85° C.

When the polymerization conversion rate reached 99%, 10 g of butadiene was further added, and polymerization was further performed for 5 minutes. Thereafter, 10 g of the polymer solution was sampled for measurement of molecular weight before modification, and a cyclohexane solution containing a hydrocarbyloxysilane compound (4.96 mmol) of the above chemical formula (1) was added and reaction was performed for 15 minutes. To the polymer solution after the reaction, a cyclohexane solution containing 3-mercaptopropyltriethoxysilane (4.96 mmol) was added, and the whole was mixed for 5 minutes. Then, to the thus obtained polymer solution, 2.0 g of 2,6-di-tert-butyl-p-cresol was added. Subsequently, the solvent was removed by performing steam stripping through the use of hot water adjusted to pH=9 with sodium hydroxide, and the resulting rubber was dried with hot rolls adjusted to a temperature of 110° C. Thus, a modified conjugated diene rubber K was obtained.

The polymerization recipe of the modified conjugated diene rubber K is shown in Table 1, and properties of the modified conjugated diene rubber K thus obtained are shown in Table 2. In addition, a rubber composition was prepared using the modified conjugated diene rubber K and following a compounding recipe shown in Table 3 and was then vulcanized. Thereafter, evaluations of physical properties were performed. Results thereof are shown in Table 4.

Example 12

Synthesis of Modified Conjugated Diene Rubber L, and Evaluation Thereof

A modified conjugated diene rubber L was obtained in the same manner as in Example 11, except that silicon tetrachloride (3.86 mmol) was used in place of 3-mercaptopropyltriethoxysilane (4.96 mmol) in Example 11.

The polymerization recipe of the modified conjugated diene rubber L is shown in Table 1, and properties of the modified conjugated diene rubber L thus obtained are shown in Table 2. In addition, a rubber composition was prepared using the modified conjugated diene rubber L and following a compounding recipe shown in Table 3 and was then vulcanized. Thereafter, evaluations of physical properties were performed. Results thereof are shown in Table 4.

Example 13

Synthesis of Modified Conjugated Diene Rubber M, and Evaluation Thereof

Into an autoclave reactor having an inner volume of 5 L, which had been subjected to nitrogen substitution, 2,750 g of cyclohexane, 3.25 mmol of 2,2-di(tetrahydrofuryl)propane, 125 g of styrene, 4.70 mmol of piperidine, and 365 g of 1,3-butadiene were charged. After the temperature of the contents in the reactor was adjusted to 10° C., polymerization was initiated by adding a cyclohexane solution containing n-butyllithium (5.80 mmol). The polymerization was carried out under adiabatic conditions, and the maximum temperature reached 85° C.

When the polymerization conversion rate reached 99%, 10 g of butadiene was further added, and polymerization was further performed for 5 minutes. Thereafter, 10 g of the polymer solution was sampled for measurement of molecular weight before modification, and a cyclohexane solution containing a hydrocarbyloxysilane compound (4.96 mmol) of the above chemical formula (1) was added and reaction was performed for 15 minutes. To the polymer solution after the reaction, a cyclohexane solution containing 3-aminopropyltriethoxysilane (4.96 mmol) was added, and the whole was mixed for 5 minutes. Furthermore, a cyclohexane solution containing adipic acid (20.4 mmol) was added, followed by 5-minute mixing. Then, to the thus obtained polymer solution, 2.0 g of 2,6-di-tert-butyl-p-cresol was added. Subsequently, the solvent was removed by performing steam stripping through the use of hot water adjusted to pH=6 with sodium hydroxide, and the resulting rubber was dried with hot rolls adjusted to a temperature of 110° C. Thus, a modified conjugated diene rubber M was obtained.

The polymerization recipe of the modified conjugated diene rubber M is shown in Table 1, and properties of the modified conjugated diene rubber M thus obtained are shown in Table 2. In addition, a rubber composition was prepared using the modified conjugated diene rubber M and following a compounding recipe shown in Table 3 and was then vulcanized. Thereafter, evaluations of physical properties were performed. Results thereof are shown in Table 4.

Example 14

Synthesis of Modified Conjugated Diene Rubber N, and Evaluation Thereof

A modified conjugated diene rubber N was obtained in the same manner as in Example 13, except that titanium tetrachloride (5.10 mmol) was used in place of adipic acid (20.4 mmol) in Example 13.

The polymerization recipe of the modified conjugated diene rubber N is shown in Table 1, and properties of the modified conjugated diene rubber N thus obtained are shown in Table 2. In addition, a rubber composition was prepared using the modified conjugated diene rubber N and following a compounding recipe shown in Table 3 and was then vulcanized. Thereafter, evaluations of physical properties were performed. Results thereof are shown in Table 4.

Example 15

Synthesis of Modified Conjugated Diene Rubber O, and Evaluation Thereof

A modified conjugated diene rubber 0 was obtained in the same manner as in Example 13, except that isopropyl acid phosphate (13.61 mmol) was used in place of adipic acid (20.4 mmol) in Example 13.

The polymerization recipe of the modified conjugated diene rubber 0 is shown in Table 1, and properties of the modified conjugated diene rubber 0 thus obtained are shown in Table 2. In addition, a rubber composition was prepared using the modified conjugated diene rubber 0 and following a compounding recipe shown in Table 3 and was then vulcanized. Thereafter, evaluations of physical properties were performed. Results thereof are shown in Table 4.

Example 16

Synthesis of Modified Conjugated Diene Rubber P, and Evaluation Thereof

Into an autoclave reactor having an inner volume of 5 L, which had been subjected to nitrogen substitution, 2,750 g of cyclohexane, 100.0 g of tetrahydrofuran, 180 g of styrene, and 310 g of 1,3-butadiene were charged. After the temperature of the contents in the reactor was adjusted to 20° C., polymerization was initiated by addition of a cyclohexane solution containing n-butyllithium (4.60 mmol). The polymerization was carried out under adiabatic conditions, and the maximum temperature reached 85° C.

When the polymerization conversion rate reached 99%, 10 g of butadiene was further added, and polymerization was further performed for 5 minutes. Thereafter, 10 g of the polymer solution was sampled for measurement of molecular weight before modification, and a cyclohexane solution containing a hydrocarbyloxysilane compound (3.93 mmol) of the above chemical formula (1) was added, followed by reaction for 15 minutes. To the polymer solution after the reaction, a cyclohexane solution containing 3-aminopropyltriethoxysilane (3.93 mmol) was added, and the whole was mixed for 5 minutes. Furthermore, a cyclohexane solution containing silicon tetrachloride (3.12 mmol) was added, followed by mixing for 5 minutes. Then, to the thus obtained polymer solution, 2.0 g of 2,6-di-tert-butyl-p-cresol was added, followed by addition of 187.5 g of naphthene oil (trade name: SNH46, manufactured by Sankyo Yuka Kogyo K.K.) and further mixing for 5 minutes. Subsequently, the solvent was removed from the resulting polymer solution by performing steam stripping through the use of hot water adjusted to pH=9 with sodium hydroxide, and the resulting rubber was dried with hot rolls adjusted to a temperature of 110° C. Thus, a modified conjugated diene rubber P was obtained.

The polymerization recipe of the modified conjugated diene rubber P is shown in Table 1, and properties of the modified conjugated diene rubber P thus obtained are shown in Table 2. In addition, a rubber composition was prepared using the modified conjugated diene rubber P and following a compounding recipe shown in Table 3 and was then vulcanized. Thereafter, evaluations of physical properties were performed. Results thereof are shown in Table 4.

Comparative Example 1

Synthesis of Modified Conjugated Diene Rubber Q, and Evaluation Thereof

A modified conjugated diene rubber Q was produced in the same manner as in Example 1, except that N,N-bis(triethylsilyl)aminopropylmethyldimethoxysilane was used in place of the hydrocarbyloxysilane of the chemical formula (1) in Example 1.

The polymerization recipe of the modified conjugated diene rubber Q is shown in Table 1, and properties of the modified conjugated diene rubber Q thus obtained are shown in Table 2. In addition, a rubber composition was prepared using the modified conjugated diene rubber Q and following a compounding recipe shown in Table 3 and was then vulcanized. Thereafter, evaluations of physical properties were performed. Results thereof are shown in Table 4.

Comparative Example 2

Synthesis of Modified Conjugated Diene Rubber R, and Evaluation Thereof

A modified conjugated diene rubber R was produced in the same manner as in Example 1, except that a hydrocarbyloxysilane of the following chemical formula (7) was used in place of the hydrocarbyloxysilane of the chemical formula (1) in Example 1.

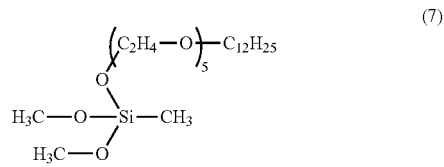

The polymerization recipe of the modified conjugated diene rubber R is shown in Table 1, and properties of the modified conjugated diene rubber R thus obtained are shown in Table 2. In addition, a rubber composition was prepared using the modified conjugated diene rubber R and following a compounding recipe shown in Table 3 and was then vulcanized. Thereafter, evaluations of physical properties were performed. Results thereof are shown in Table 4.

Comparative Example 3

Synthesis of Modified Conjugated Diene Rubber S, and Evaluation Thereof

Into an autoclave reactor having an inner volume of 5 L, which had been subjected to nitrogen substitution, 2,750 g of cyclohexane, 50.0 g of tetrahydrofuran, 125 g of styrene, and 365 g of 1,3-butadiene were charged. After the temperature of the contents in the reactor was adjusted to 10° C., polymerization was initiated by addition of a cyclohexane solution containing n-butyllithium (5.80 mmol). The polymerization was carried out under adiabatic conditions, and the maximum temperature reached 85° C.

When the polymerization conversion rate reached 99%, 10 g of butadiene was further added, and polymerization was further performed for 5 minutes. Thereafter, 10 g of the polymer solution was sampled for measurement of molecular weight before modification, and a cyclohexane solution containing a hydrocarbyloxysilane compound (4.96 mmol) of the above chemical formula (7) was added, followed by reaction for 15 minutes. To the polymer solution after the reaction, a cyclohexane solution containing 3-aminopropyltriethoxysilane (4.96 mmol) was added, and the whole was mixed for 5 minutes. Then, to the thus obtained polymer solution, 2.0 g of 2,6-di-tert-butyl-p-cresol was added. Subsequently, the solvent was removed from the resulting polymer solution by performing steam stripping through the use of hot water adjusted to pH=9 with sodium hydroxide, and the resulting rubber was dried with hot rolls adjusted to a temperature of 110° C. Thus, a modified conjugated diene rubber S was obtained.

The polymerization recipe of the modified conjugated diene rubber S is shown in Table 1, and properties of the modified conjugated diene rubber S thus obtained are shown in Table 2. In addition, a rubber composition was prepared using the modified conjugated diene rubber S and following a compounding recipe shown in Table 3 and was then vulcanized. Thereafter, evaluations of physical properties were performed. Results thereof are shown in Table 4.

Comparative Example 4

Synthesis of Modified Conjugated Diene Rubber T, and Evaluation Thereof

Into an autoclave reactor having an inner volume of 5 L, which had been subjected to nitrogen substitution, 2,750 g of cyclohexane, 100.0 g of tetrahydrofuran, 180 g of styrene, and 310 g of 1,3-butadiene were charged. After the temperature of the contents in the reactor was adjusted to 20° C., polymerization was initiated by addition of a cyclohexane solution containing n-butyllithium (4.60 mmol). The polymerization was carried out under adiabatic conditions, and the maximum temperature reached 85° C.

When the polymerization conversion rate reached 99%, 10 g of butadiene was further added, and polymerization was further performed for 5 minutes. Thereafter, 10 g of the polymer solution was sampled for measurement of molecular weight before modification, and a cyclohexane solution containing a hydrocarbyloxysilane compound (3.93 mmol) of the above chemical formula (7) was added, followed by reaction for 15 minutes. To the polymer solution after the reaction, a cyclohexane solution containing 3-aminopropyltriethoxysilane (3.93 mmol) was added, and the whole was mixed for 5 minutes. Furthermore, a cyclohexane solution containing silicon tetrachloride (3.12 mmol) was added, followed by mixing for 5 minutes. Then, to the thus obtained polymer solution, 2.0 g of 2,6-di-tert-butyl-p-cresol was added, followed by addition of 187.5 g of naphthene oil (trade name: SNH46, manufactured by Sankyo Yuka Kogyo K.K.) and further mixing for 5 minutes. Subsequently, the solvent was removed from the resulting polymer solution by performing steam stripping through the use of hot water adjusted to pH=9 with sodium hydroxide, and the resulting rubber was dried with hot rolls adjusted to a temperature of 110° C. Thus, a modified conjugated diene rubber T was obtained.

The polymerization recipe of the modified conjugated diene rubber T is shown in Table 1, and properties of the modified conjugated diene rubber T thus obtained are shown in Table 2. In addition, a rubber composition was prepared using the modified conjugated diene rubber T and following a compounding recipe shown in Table 3 and was then vulcanized. Thereafter, evaluations of physical properties were performed. Results thereof are shown in Table 4.

[Kneading Method of Rubber Composition and Evaluation of Properties]:

As first-step kneading, the modified conjugated diene rubber produced in each of Examples and Comparative Examples was kneaded with butadiene rubber, natural rubber, extension oil, carbon black, silica, a silane coupling agent, stearic acid, an ageing inhibitor, and zinc oxide by using a plastomill (an inner volume: 250 cc) fitted with a temperature control device under conditions that the filling rate was 72% and the number of revolutions was 60 rpm. Then, as second-step kneading, the compounded matter obtained above was cooled to room temperature, and kneaded with sulfur and a vulcanization accelerator according to a compounding recipe shown in Tables 3 and 4. The kneaded matter was subjected to molding, and vulcanized at 160° C. for a predetermined time by means of a vulcanizing press. Evaluations of the properties for the following tire performance were carried out.

(i) Mooney viscosity: Each of the rubber compositions before vulcanization was taken as a measurement sample, and thereon the measurement in accordance with JIS K6300 was made by using an L-rotor under conditions that the preheating was carried out for 1 minute, the running time of the rotor is 4 minutes, and the temperature is 100° C.

(ii) Tensile strength: In accordance with JIS K6301, a 300% modulus was measured. It was expressed as an index, and the greater the numerical value thereof is, the greater and the more satisfactory the tensile strength is.

(iii) 0° C. tan δ: Vulcanized rubber was used as a measurement sample, and measurement was carried out by using a dynamic spectrometer (manufactured by US Rheometric Inc.) under conditions that the tensile dynamic distortion was 0.14%, the angular velocity was 100 radians per second, and the temperature is 0° C. It was expressed as an index, and the greater the numerical value thereof is, the greater and the more satisfactory the wet skid resistance is.

(iv) 70° C. tan δ: Vulcanized rubber was used as a measurement sample, measurement was carried out by using a dynamic spectrometer (manufactured by US Rheometric Inc.) under conditions that the tensile dynamic distortion was 0.7%, the angular velocity was 100 radians per second, and the temperature was 70° C. It was expressed as an index, and the greater the numerical value thereof is, the lesser and the more satisfactory the low hysteresis-loss property is.

(v) Abrasion resistance: Vulcanized rubber was used as a measurement sample, and abrasion resistance thereof was determined by using a DIN abrasion tester (manufactured by Toyo Seiki Co., Ltd.) under a load of 10N at 25° C. in accordance with JIS K 6264. The abrasion resistance was expressed as an index, and the greater the numerical value thereof is, the more satisfactory the abrasion resistance is.

TABLE 1

|  | Example 1 | Example 2 | Example 3 | Example 4 | Example 5 | Example 6 | Example 7 | Example 8 | Example 9 |
|---|---|---|---|---|---|---|---|---|---|
| Kind of modified conjugated diene rubber | A | B | C | D | E | F | G | H | I |
| Polymerization recipe |  |  |  |  |  |  |  |  |  |
| Solvent |  |  |  |  |  |  |  |  |  |
| cyclohexane (g) | 2750 | 2750 | 2750 | 2750 | 2750 | 2750 | 2750 | 2750 | 2750 |
| Randamizer |  |  |  |  |  |  |  |  |  |
| tetrahydrofuran (g) | 50.0 | 50.0 | 10.3 | 50.0 | 50.0 | 50.0 | 50.0 | 50.0 | 50.0 |
| 2,2-di(tetrahydrofuryl)propane (mmol) | — | — | — | — | — | — | — | — | — |
| Polymerization monomer |  |  |  |  |  |  |  |  |  |
| styrene (g) | 125 | 125 | 50 | 125 | 125 | 125 | 125 | 125 | 125 |
| butadiene (g) | 365 | 365 | 440 | 365 | 365 | 365 | 365 | 365 | 365 |
| further added butadiene (g) | 10 | 10 | 10 | 10 | 10 | 10 | 10 | 10 | 10 |
| Polymerization initiator |  |  |  |  |  |  |  |  |  |
| piperidine (mmol) | — | — | — | — | — | — | — | — | — |
| n-butyllithium (mmol) | 5.8 | 5.8 | 5.8 | 5.8 | 5.8 | 5.8 | 5.8 | 5.8 | 5.8 |
| First hydrocarbyloxysilane compound |  |  |  |  |  |  |  |  |  |
| N—Si-1 *1 (mmol) | 4.96 | — | — | — | — | — | 4.96 | 4.96 | 4.96 |
| N—Si-2 *2 (mmol) | — | 4.96 | — | — | — | — | — | — | — |
| N—Si-3 *3 (mmol) | — | — | 4.96 | — | — | — | — | — | — |
| N—Si-4 *4 (mmol) | — | — | — | 4.96 | — | — | — | — | — |
| S—Si-1 *5 (mmol) | — | — | — | — | 4.96 | — | — | — | — |
| P—Si-1 *6 (mmol) | — | — | — | — | — | 4.96 | — | — | — |
| Hydrocarbyloxysilane compound |  |  |  |  |  |  |  |  |  |
| N—Si-5 *7 (mmol) | — | — | — | — | — | — | — | — | — |
| Si-1 *8 (mmol) | — | — | — | — | — | — | — | — | — |
| Second hydrocarbyloxysilane compound |  |  |  |  |  |  |  |  |  |
| N-1 *9 (mmol) | — | — | — | — | — | — | 4.96 | — | 4.96 |
| N-2 *10 (mmol) | — | — | — | — | — | — | — | — | — |
| S-1 *11 (mmol) | — | — | — | — | — | — | — | — | — |
| Onium-forming agent |  |  |  |  |  |  |  |  |  |
| Cl-1 *12 (mmol) | — | — | — | — | — | — | — | — | — |
| A-1 *13 (mmol) | — | — | — | — | — | — | — | — | — |
| Cl-2 *14 (mmol) | — | — | — | — | — | — | — | — | — |
| P-1 *15 (mmol) | — | — | — | — | — | — | — | — | — |
| Condensation catalyst |  |  |  |  |  |  |  |  |  |
| Sn-1 *16 (mmol) | — | — | — | — | — | — | 4.96 | — | — |
| Zr-1 *17 (mmol) | — | — | — | — | — | — | — | 4.96 | — |
| Extension oil |  |  |  |  |  |  |  |  |  |
| Oil *18 (g) | — | — | — | — | — | — | — | — | — |

|  | Example 10 | Example 11 | Example 12 | Example 13 | Example 14 | Example 15 | Example 16 |
|---|---|---|---|---|---|---|---|
| Kind of modified conjugated diene rubber | J | K | L | M | N | O | P |
| Polymerization recipe |  |  |  |  |  |  |  |
| Solvent |  |  |  |  |  |  |  |
| cyclohexane (g) | 2750 | 2750 | 2750 | 2750 | 2750 | 2750 | 2750 |
| Randamizer |  |  |  |  |  |  |  |
| tetrahydrofuran (g) | 50.0 | — | — | — | — | — | 100.0 |
| 2,2-di(tetrahydrofuryl)propane (mmol) | — | 3.25 | 3.25 | 3.25 | 3.25 | 3.25 | — |
| Polymerization monomer |  |  |  |  |  |  |  |
| styrene (g) | 125 | 125 | 125 | 125 | 125 | 125 | 180 |
| butadiene (g) | 365 | 365 | 365 | 365 | 365 | 365 | 310 |
| further added butadiene (g) | 10 | 10 | 10 | 10 | 10 | 10 | 10 |

TABLE 1-continued

| | | | | | | | |
|---|---|---|---|---|---|---|---|
| Polymerization initiator | | | | | | | |
| piperidine (mmol) | — | 4.70 | 4.70 | 4.70 | 4.70 | 4.70 | — |
| n-butyllithium (mmol) | 5.8 | 5.8 | 5.8 | 5.8 | 5.8 | 5.8 | 4.6 |
| First hydrocarbyloxysilane compound | | | | | | | |
| N—Si-1 *1 (mmol) | 4.96 | 4.96 | 4.96 | 4.96 | 4.96 | 4.96 | 3.93 |
| N—Si-2 *2 (mmol) | — | — | — | — | — | — | — |
| N—Si-3 *3 (mmol) | — | — | — | — | — | — | — |
| N—Si-4 *4 (mmol) | — | — | — | — | — | — | — |
| S—Si-1 *5 (mmol) | — | — | — | — | — | — | — |
| P—Si-1 *6 (mmol) | — | — | — | — | — | — | — |
| Hydrocarbyloxysilane compound | | | | | | | |
| N—Si-5 *7 (mmol) | — | — | — | — | — | — | — |
| Si-1 *8 (mmol) | — | — | — | — | — | — | — |
| Second hydrocarbyloxysilane compound | | | | | | | |
| N-1 *9 (mmol) | — | — | — | 4.96 | 4.96 | 4.96 | 3.93 |
| N-2 *10 (mmol) | 4.96 | — | — | — | — | — | — |
| S-1 *11 (mmol) | — | 4.96 | — | — | — | — | — |
| Onium-forming agent | | | | | | | |
| Cl-1 *12 (mmol) | — | — | 3.86 | — | — | — | 3.12 |
| A-1 *13 (mmol) | — | — | — | 20.4 | — | — | — |
| Cl-2 *14 (mmol) | — | — | — | — | 5.10 | — | — |
| P-1 *15 (mmol) | — | — | — | — | — | 13.61 | — |
| Condensation catalyst | | | | | | | |
| Sn-1 *16 (mmol) | — | — | — | — | — | — | — |
| Zr-1 *17 (mmol) | — | — | — | — | — | — | — |
| Extension oil | | | | | | | |
| Oil *18 (g) | — | — | — | — | — | — | 187.5 |

| | | Comparative Example 1 | Comparative Example 2 | Comparative Example 3 | Comparative Example 4 |
|---|---|---|---|---|---|
| | Kind of modified conjugated diene rubber | Q | R | S | T |
| | Polymerization recipe | | | | |
| | Solvent | | | | |
| | cyclohexane (g) | 2750 | 2750 | 2750 | 2750 |
| | Randamizer | | | | |
| | tetrahydrofuran (g) | 50.0 | 50.0 | 50.0 | 100.0 |
| | 2,2-di(tetrahydrofuryl)propane (mmol) | — | — | — | — |
| | Polymerization monomer | | | | |
| | styrene (g) | 125 | 125 | 125 | 180 |
| | butadiene (g) | 365 | 365 | 365 | 310 |
| | further added butadiene (g) | 10 | 10 | 10 | 10 |
| | Polymerization initiator | | | | |
| | piperidine (mmol) | — | — | — | — |
| | n-butyllithium (mmol) | 5.8 | 5.8 | 5.8 | 4.6 |
| | First hydrocarbyloxysilane compound | | | | |
| | N—Si-1 *1 (mmol) | — | — | — | — |
| | N—Si-2 *2 (mmol) | — | — | — | — |
| | N—Si-3 *3 (mmol) | — | — | — | — |
| | N—Si-4 *4 (mmol) | — | — | — | — |
| | S—Si-1 *5 (mmol) | — | — | — | — |
| | P—Si-1 *6 (mmol) | — | — | — | — |
| | Hydrocarbyloxysilane compound | | | | |
| | N—Si-5 *7 (mmol) | 4.96 | — | — | — |
| | Si-1 *8 (mmol) | — | 4.96 | 4.96 | 3.93 |

TABLE 1-continued

|  |  |  |  |  |  |
|---|---|---|---|---|---|
| Second hydrocarbyloxysilane compound | | | | | |
| N-1 *9 (mmol) | — | — | 4.96 | 3.93 | |
| N-2 *10 (mmol) | — | — | — | — | |
| S-1 *11 (mmol) | — | — | — | — | |
| Onium-forming agent | | | | | |
| Cl-1 *12 (mmol) | — | — | — | 3.12 | |
| A-1 *13 (mmol) | — | — | — | — | |
| Cl-2 *14 (mmol) | — | — | — | — | |
| P-1 *15 (mmol) | — | — | — | — | |
| Condensation catalyst | | | | | |
| Sn-1 *16 (mmol) | — | — | — | — | |
| Zr-1 *17 (mmol) | — | — | — | — | |
| Extension oil | | | | | |
| Oil *18 (g) | — | — | — | 187.5 | |

*1: chemical formula 1
*2: chemical formula 2
*3: chemical formula 3
*4: chemical formula 4
*5: chemical formula 5
*6: chemical formula 6,
*7: N,N-bis(triethylsilyl)aminopropylmethyldimethoxysilane
*8: chemical formula 7
*9: 3-aminopropyltriethoxysilane
*10: N-2-(aminoethyl)-3-aminopropyltrimethoxysilane
*11: 3-mercaptopropyltriethoxysilane
*12: silicone tetrachloride
*13: adipic acid
*14: titanium tetrachloride
*15: isopropyl acid phosphate
*16: bis(2-ethylhexanoato)tin
*17: bis(2-ethylhexanoato)zirconium oxide
*18: naphthene oil (PCA less than 3%)

TABLE 2

|  | Example 1 | Example 2 | Example 3 | Example 4 | Example 5 | Example 6 | Example 7 | Example 8 | Example 9 |
|---|---|---|---|---|---|---|---|---|---|
| Kind of modified conjugated diene rubber | A | B | C | D | E | F | G | H | I |
| [Properties of modified conjugated diene rubber] | | | | | | | | | |
| Amount of styrene unit (mass %) | 25 | 25 | 10 | 25 | 25 | 25 | 25 | 25 | 25 |
| Vinyl content (%) | 54 | 55 | 40 | 55 | 56 | 56 | 54 | 54 | 56 |
| Glass transition temperature (° C.) | −30 | −30 | −61 | −31 | −31 | −30 | −30 | −30 | −31 |
| Weight-average molecular weight before modification (ten thousand) | 20 | 19 | 19 | 19 | 20 | 19 | 20 | 19 | 20 |
| Mooney viscosity (ML1 + 4, 100° C.) | 10 | 9 | 8 | 8 | 14 | 11 | 23 | 57 | 16 |

|  | Example 10 | Example 11 | Example 12 | Example 13 | Example 14 | Example 15 | Example 16 |
|---|---|---|---|---|---|---|---|
| Kind of modified conjugated diene rubber | J | K | L | M | N | O | P |
| [Properties of modified conjugated diene rubber] | | | | | | | |
| Amount of styrene unit (mass %) | 25 | 25 | 25 | 25 | 25 | 25 | 36 |
| Vinyl content (%) | 56 | 56 | 55 | 56 | 56 | 55 | 63 |
| Glass transition temperature (° C.) | −31 | −32 | −32 | −32 | −32 | −31 | −14 |
| Weight-average molecular weight before modification (ten thousand) | 19 | 20 | 19 | 20 | 19 | 18 | 28 |
| Mooney viscosity (ML1 + 4, 100° C.) | 18 | 22 | 62 | 68 | 65 | 70 | 60 |

TABLE 2-continued

|  |  | Comparative Example 1 | Comparative Example 2 | Comparative Example 3 | Comparative Example 4 |
|---|---|---|---|---|---|
|  | Kind of modified conjugated diene rubber | Q | R | S | T |
|  | [Properties of modified conjugated diene rubber] |  |  |  |  |
|  | Amount of styrene unit (mass %) | 25 | 25 | 25 | 36 |
|  | Vinyl content (%) | 56 | 56 | 55 | 64 |
|  | Glass transition temperature (° C.) | −31 | −30 | −30 | −13 |
|  | Weight-average molecular weight before modification (ten thousand) | 19 | 20 | 19 | 28 |
|  | Mooney viscosity (ML1 + 4, 100° C.) | 8 | 35 | 44 | 62 |

TABLE 3

| Compounding recipe (phr) | I | II |
|---|---|---|
| Modified conjugated diene rubber | 70 | 96.25 |
| Butadiene rubber *1) |  | 30 |
| Natural rubber | 30 |  |
| Extension oil *2) | 37.5 | 11.25 |
| Carbon black *3) | 5.6 | 5.6 |
| Silica *4) | 85 | 85 |
| Silane coupling agent *5) | 5.6 | 5.6 |
| Stearic acid | 2.0 | 2.0 |
| Ageing inhibitor *6) | 1.0 | 1.0 |
| Zinc oxide | 3.0 | 3.0 |
| Vulcanization accelerator CZ *7) | 1.8 | 1.8 |
| Vulcanization accelerator D *8) | 1.5 | 1.5 |
| Sulfur | 1.5 | 1.5 |

*1) BR01, manufactured by JSR Corporation
*2) SNH46, manufactured by Sankyo Yuka Kogyo K.K.
*3) DIABLACK N339, manufactured by Mitsubishi Chemical Corporation
*4) Nipsil AQ, manufactured by Tosoh Silica Corporation
*5) Si69, manufactured by Evonik Industries AG
*6) NOCRAC 810NA, manufactured by Ouchi Shinko Chemical Industrial Co., Ltd.
*7) NOCCELER CZ, manufactured by Ouchi Shinko Chemical Industrial Co., Ltd.
*8) NOCCELER D, manufactured by Ouchi Shinko Chemical Industrial Co., Ltd.

TABLE 4

|  | Example 1 | Example 2 | Example 3 | Example 4 | Example 5 | Example 6 | Example 7 | Example 8 | Example 9 |
|---|---|---|---|---|---|---|---|---|---|
| Kind of modified conjugated diene rubber | A | B | C | D | E | F | G | H | I |
| [Properties of cross-liked rubber composition] |  |  |  |  |  |  |  |  |  |
| Compounding recipe | I | I | I | I | I | I | I | I | I |
| Mooney viscosity (ML1 + 4, 100° C.) | 93 | 88 | 84 | 82 | 90 | 81 | 90 | 92 | 95 |
| Tensile strength (index) | 108 | 108 | 106 | 106 | 104 | 104 | 110 | 110 | 109 |
| 0° C. tanδ (index) | 120 | 122 | 107 | 115 | 117 | 115 | 125 | 123 | 122 |
| 70° C. tanδ (index) | 114 | 111 | 124 | 108 | 109 | 111 | 119 | 116 | 116 |
| Abrasion resistance (index) | 110 | 108 | 123 | 105 | 105 | 103 | 111 | 108 | 108 |

|  | Example 10 | Example 11 | Example 12 | Example 13 | Example 14 | Example 15 | Example 16 |
|---|---|---|---|---|---|---|---|
| Kind of modified conjugated diene rubber | J | K | L | M | N | O | P |
| [Properties of cross-liked rubber composition] |  |  |  |  |  |  |  |
| Compounding recipe | I | I | I | I | I | I | II |
| Mooney viscosity (ML1 + 4, 100° C.) | 96 | 102 | 94 | 93 | 91 | 89 | 106 |
| Tensile strength (index) | 109 | 112 | 109 | 110 | 110 | 111 | 118 |
| 0° C. tanδ (index) | 123 | 131 | 130 | 133 | 134 | 129 | 140 |
| 70° C. tanδ (index) | 114 | 119 | 118 | 117 | 119 | 120 | 105 |
| Abrasion resistance (index) | 110 | 110 | 109 | 114 | 117 | 113 | 106 |

TABLE 4-continued

|  | Comparative Example 1 | Comparative Example 2 | Comparative Example 3 | Comparative Example 4 |
|---|---|---|---|---|
| Kind of modified conjugated diene rubber | Q | R | S | T |
| [Properties of cross-liked rubber composition] | | | | |
| Compounding recipe | I | I | I | II |
| Mooney viscosity (ML1 + 4, 100° C.) | 80 | 65 | 64 | 92 |
| Tensile strength (index) | 100 | 94 | 93 | 102 |
| 0° C. tanδ (index) | 100 | 74 | 75 | 93 |
| 70° C. tanδ (index) | 100 | 80 | 78 | 92 |
| Abrasion resistance (index) | 100 | 91 | 93 | 88 |

As is evident from Table 4, it is understood that the compositions (Examples 1 to 16) of the present invention using the modified conjugated diene rubber of the present invention have achieved marked improvement in a balance between wet skid resistance and a low hysteresis-loss property without impairments of tensile strength and abrasion resistance.

From the physical-property evaluation result of the modified conjugated diene rubber Q (modified with a hydrocarbyloxysilane compound having only a functional group (b)) of Comparative Example 1, it can be confirmed that a hydrocarbyloxysilane compound having both of the functional groups (a) and (b) is of importance to improvement in a balance between wet skid resistance and a low hysteresis-loss property.

From the physical-property evaluation results of the modified conjugated diene rubber R to the modified conjugated diene rubber T (modified with a hydrocarbyloxysilane compound having only a functional group (a)) of Comparative Examples 2 to 4, it can be confirmed that a hydrocarbyloxysilane compound having both of the functional groups (a) and (b) is of importance to improvements in a balance between wet skid resistance and a low hysteresis-loss property.

The invention claimed is:

1. A method for producing a modified conjugated diene rubber, the method comprising:
   (A) reacting a conjugated diene polymer comprising an alkali metal or alkaline-earth metal active end with a first hydrocarbyloxysilane compound comprising functional groups (a) and (b), thereby obtaining a modified conjugated diene rubber,
   wherein the conjugated diene polymer is obtained by a process comprising polymerizing a conjugated diene compound or a conjugated diene compound and an aromatic vinyl compound,
   the functional group (a) is an alkyl polyether group and the functional group (b) is a group convertible into an onium
   wherein the functional group (b) is at least one functional group selected from the group consisting of a nitrogen-containing group formed by substituting two protective groups for two hydrogen atoms of a primary amino group, a nitrogen-containing group formed by substituting one protective group for one hydrogen atom of a secondary amino group, a tertiary amino group, an imino group, a pyridyl group, a phosphorus-containing group formed by substituting two protective groups for two hydrogen atoms of a primary phosphino group, hoschorus-containin rou formed b substituting one protective group for one hydrogen atom of a secondary phosphino group, a tertiary phosphino group, and a sulfur-containing group formed by substituting one protective group for one hydrogen atom of a thiol.

2. The method according to claim 1, comprising at least one selected from the group consisting of, after the reacting (A):
   (B) mixing the modified conjugated diene rubber with an onium-forming agent, after the reacting (A),
   (C) mixing the modified conjugated diene rubber with a catalyst comprising a metal element for condensing a first hydrocarbyloxysilane compound, after the reacting (A), and
   (D) mixing the modified conjugated diene rubber with a second hydrocarbyloxysilane compound comprising a group convertible into an onium, after the reacting (A).

3. The method according to claim 2,
   wherein the onium-forming agent is at least one compound selected from the group consisting of a silicon halide compound, a tin halide compound, an aluminum halide compound, a titanium halide compound, a zirconium halide compound, a germanium halide compound, a gallium halide compound, a zinc halide compound, a sulfuric ester, a phosphoric ester, a carboxylic acid, and a sulfonic acid.

4. The method according to claim 2,
   wherein the catalyst is a metallic compound comprising at least one metal element selected from-group 4, group 12, group 13, group 14, and group 15 of the periodic table.

5. The method according to claim 4,
   wherein the catalyst is an alkoxide, carboxylate salt, or acetylacetonate complex salt of the metal element.

6. The method according to claim 2,
   wherein the method comprises at least the mixing (D) and the group convertible into an onium in the second hydrocarbyloxysilane compound is at least one group selected from the group consisting of a primary amino group, a secondary amino group, a tertiary amino group, an imino group, a pyridyl group, a primary phosphino group, a secondary phosphino group, a tertiary phosphino group, and a thiol group.

7. The method according to claim 1, further comprising:
   bringing water into contact with said modified conjugated diene rubber.

8. A modified conjugated diene rubber obtained by-the method according to claim 1.

9. A rubber composition, comprising:
   the modified conjugated diene rubber according to claim 8, silica, carbon black, or both silica and carbon black and a crosslinking agent.

10. A crosslinked rubber, prepared by crosslinking the rubber composition according to claim 9.

11. A tire, comprising:
the crosslinked rubber according to claim 10.

12. A method for producing a modified conjugated diene rubber, the method comprising:
- (A) reacting a conjugated diene polymer comprising an alkali metal or alkaline-earth metal active end with a first hydrocarbyloxysilane compound comprising functional groups (a) and (b), thereby obtaining a modified conjugated diene rubber, wherein the conjugated diene polymer is obtained by a process comprising polymerizing a conjugated diene compound or a conjugated diene compound and an aromatic vinyl compound, the functional group (a) is an alkyl polyether group and the functional group (b) is a group convertible into an onium wherein the first hydrocarbyloxysilane compound is a silane compound represented by formula (I):

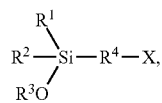
(I)

wherein $R^1$ is an alkyl polyether group represented by formula:

—O—$(R^5$—O$)_m$—$R^6$, wherein each $R^5$ is independently a hydrocarbon group having 1 to 30 carbon atoms, m is from 1 to 30 on average, and $R^6$ is a hydrocarbon group having 1 to 30 carbon atoms;

$R^2$ is the same as $R^1$ or is an alkyl group having 1 to 12 carbon atoms or a group represented by $R^7O$—, wherein $R^7$ is a hydrocarbon group having 1 to 30 carbon atoms or a group represented by $(R^8)_3Si$—, wherein $R^8$ is an alkyl group or an alkenyl group which has 1 to 30 carbon atoms;

$R^3$ is a hydrocarbon group having 1 to 30 carbon atoms;

$R^4$ is a hydrocarbon group having 1 to 30 carbon atoms; and

X is a nitrogen-containing group, a phosphorus-containing group, or a sulfur-containing group, which has no active hydrogen or whose active hydrogen is substituted by a protective group, wherein at least one of a nitrogen, phosphorus, or sulfur atom of the nitrogen-containing group, the phosphorus-containing group, or the sulfur-containing group is bound to $R^4$.

* * * * *